US008065171B2

(12) United States Patent  (10) Patent No.: US 8,065,171 B2
Nguyen et al.  (45) Date of Patent: Nov. 22, 2011

(54) EVENT PLANNING SYSTEM

(75) Inventors: Justin T. Nguyen, Santa Clara, CA (US); John Chang, Cupertino, CA (US); Joseph Chen, Union City, CA (US); Raymond Thackeray, San Francisco, CA (US); Hoselito Stanovic, San Jose, CA (US); Bruce Leong, Milpitas, CA (US); Adam Goodrich, Mossman (AU)

(73) Assignee: StarCite, Inc., Philadelphia, PA (US)

( * ) Notice: Subject to any disclaimer, the term of this patent is extended or adjusted under 35 U.S.C. 154(b) by 1276 days.

(21) Appl. No.: 10/785,382

(22) Filed: Feb. 23, 2004
(Under 37 CFR 1.47)

(65) Prior Publication Data
US 2005/0033615 A1  Feb. 10, 2005

Related U.S. Application Data

(63) Continuation of application No. 09/597,969, filed on Jun. 20, 2000, now abandoned.

(60) Provisional application No. 60/140,525, filed on Jun. 22, 1999.

(51) Int. Cl.
*G06Q 30/00* (2006.01)
(52) U.S. Cl. .................................. 705/5; 705/40; 705/9
(58) Field of Classification Search .................. 705/9, 5, 705/14
See application file for complete search history.

(56) References Cited

U.S. PATENT DOCUMENTS
4,819,191 A  4/1989  Scully et al.
(Continued)

FOREIGN PATENT DOCUMENTS
EP  0276425 A2  3/1998
(Continued)

OTHER PUBLICATIONS
Dialog file 275 # 02166641 "Contacts for the Web and desktop", Susan Borden, Computer Shopper, v18, n1 p506, Jan. 1998.*
(Continued)

*Primary Examiner* — Raquel Alvarez
(74) *Attorney, Agent, or Firm* — Fenwick & West LLP

(57) ABSTRACT

An event planning process is provided for execution by a server system in a computer network including a plurality of user terminals communicatively coupled with the server system via the network. The process includes the steps of: providing an event planning graphical user interface at a user terminal, the interface enabling a user to plan an event; receiving event information input by the user, the event information indicating a scheduled event, at least one invitee to be invited to the scheduled event, and information indicative of RSVP fees required to attend the scheduled event; providing an invitation to the invitee, the invitation indicating the scheduled event and the RSVP fees, and soliciting a response to the invitation, wherein an affirmative response to the invitation requires a payment as defined by the RSVP fees; receiving RSVP status information including payment information from the invitee; and verifying the payment information. The steps of providing an invitation to the invitee and receiving RSVP status information further include: generating an invitation Web page based on the event information, the invitation Web page being accessible via the network and being operative to provide an invitation response graphical user interface for enabling the invitee to respond to the invitation; sending an invitation message to the invitee, the invitation message prompting the invitee to view the invitation Web page; and receiving input provided by the invitee via the invitation Web page, the input provided by the invitee indicating the RSVP status information.

42 Claims, 31 Drawing Sheets

U.S. PATENT DOCUMENTS

| | | | |
|---|---|---|---|
| 5,528,745 | A | 6/1996 | King et al. |
| 5,790,793 | A | 8/1998 | Higley |
| 5,801,698 | A | 9/1998 | Lection et al. |
| 5,855,006 | A * | 12/1998 | Huemoeller et al. ............. 705/9 |
| 5,948,040 | A | 9/1999 | DeLorme et al. |
| 5,960,406 | A * | 9/1999 | Rasansky et al. ................ 705/9 |
| 6,026,430 | A | 2/2000 | Butman et al. |
| 6,029,141 | A | 2/2000 | Bezos et al. |
| 6,253,998 | B1 * | 7/2001 | Ziarno .......................... 235/380 |
| 6,507,870 | B1 | 1/2003 | Yokell et al. |
| 6,778,807 | B1 | 8/2004 | Martino et al. |
| 6,826,540 | B1 | 11/2004 | Plantec et al. |
| 7,010,530 | B2 | 3/2006 | Bartkowiak et al. |
| 2001/0014865 | A1 | 8/2001 | Franke |
| 2002/0002482 | A1 | 1/2002 | Thomas |
| 2002/0016729 | A1 | 2/2002 | Breitenbach et al. |
| 2002/0035632 | A1 | 3/2002 | Matsumoto |
| 2002/0082960 | A1 | 6/2002 | Goedken |
| 2002/0111845 | A1 | 8/2002 | Chong |
| 2002/0128934 | A1 | 9/2002 | Shaer |
| 2002/0154178 | A1 | 10/2002 | Barnett et al. |
| 2002/0156787 | A1 | 10/2002 | Jameson et al. |
| 2002/0169826 | A1 | 11/2002 | Yano et al. |
| 2002/0178041 | A1 | 11/2002 | Krantz et al. |
| 2003/0055724 | A1 | 3/2003 | Battin et al. |
| 2003/0083962 | A1 | 5/2003 | Araki et al. |
| 2004/0049538 | A1 | 3/2004 | Akamatsu et al. |

FOREIGN PATENT DOCUMENTS

EP            0921670 A2     6/1999

OTHER PUBLICATIONS

Proquest document. "Evite.com Launches free web-based group activity organizer", Jul. 19, 1999, p. 1, PR Newswire.*

Dialog, file 613 #00184206 SeeUther.com Launhes First End-to-End Online event Planning Site. PR Newswire. Sep. 28, 1999.*

Dialog reference, file 810 #0747709 Leukemia Society: Cocktail Party to Benefit Linsy Smith—10 year old Leukemia Patient, Sep. 18, 1997, News/assigment/Lifestyle Editors and Health/Medical Writers.*

Borden, S., "Contacts for the Web and Desktop," Computer Shopper, Jan. 1998, vol. 18, No. 1.

European Examination Report, European Patent Application No. 00942980.4, Jul. 8, 2003, 5 pages.

European Search Report, European Patent Application No. 00942980.4, Feb. 19, 2003, 4 pages.

"Event411—Personalized Event Planning," Internet Article, Event411.com, Inc., Apr. 27, 1999, [Online] [Retrieved on Jan. 27, 2003] Retrieved from the Internet<URL:http://web.archive.org/web/19990427100314/www.event411.com/corporate/company/default.cfm>.

"Event Planner Plus TM. Data Sheet," Internet Article, Certain Software, Inc., Feb. 11, 1998, [Online] [Retrieved on Jan. 28, 2003] Retrieved from the Internet<URL:http://web.archive.org/web/19980211142520/http://www.certain.com/datasheet.htm>.

"ICM's Event Manager Series," Internet Article, International Conference Management, May 7, 1999, [Online] [Retrieved on Jan. 29, 2003] Retrieved from the Internet<URL:http://web.archive.org/web/19990507145240/conference.com/software/index.html>.

Oulette, T., "Calendaring and Scheduling Application to Ride Web Wave," Mar. 18, 1996, vol. 30, No. 12.

PCT International Search Report, PCT Application No. PCT/US00/16965, Feb. 8, 2001, 6 pages.

PCT Written Opinion, PCT Application No. PCT/US00/16965, Jun. 15, 2001, 4 pages.

PCT International Preliminary Examination Report, PCT Application No. PCT/US00/16965, Oct. 12, 2001, 5 pages.

Schmidt, K. et al., "A Generic System for Web-Based Group Interaction," Proceedings of the Thirty-First Hawaii International Conference on System Sciences, IEEE, Jan. 6, 1998, pp. 545-554.

United States Office Action, U.S. Appl. No. 10/007,315, May 13, 2008, 21 pages.

United States Office Action, U.S. Appl. No. 10/007,315, Nov. 14, 2007, 24 pages.

United States Office Action, U.S. Appl. No. 10/007,315, May 31, 2006, 21 pages.

United States Office Action, U.S. Appl. No. 10/007,315, Oct. 5, 2005, 13 pages.

* cited by examiner

```
                    ┌─ 350
                    │

HEADER IMAGE
                     352

EVENT NAME:  [         ]  ── 358
SALUTATION:  [You have been invited to]  ── 360
                                          ── 362
┌─ WHEN: ──────────────────────────┐
│   [JUN] [22] [2000]   VIEW       │      ┌────────────┐
│                       CALENDAR   │      │            │
│   [PACIFIC STANDARD TIME]        │      │ MAIN IMAGE │
│                                  │      │    354     │
│ ⊙ [09] [00] [PM]                 │      │            │
│                                  │      └────────────┘
│ ⊙ SHOW NO TIME                   │
└──────────────────────────────────┘

┌─ DURATION: ──────────────────┐ ── 364   WHAT'S HAPPENING:
│ ⊙ [1] HOURS  [0] MINUTES     │          ┌────────────────────┐
│                              │   372 ─  │ DINNER AND FUNDRAISER│
│ ○ [1] DAYS  ○ OPEN ENDED     │          │                    │
└──────────────────────────────┘          │                    │
                                          │                    │
┌─ WHERE: ─────────────────────────┐      │                    │
│  LOCATION  [EVENT PLAZA]         │      └────────────────────┘
│                                  │ 376 ↘  ☑ LIST EVENTS IN THE
│  ADDRESS   [10 MAIN STREET]      │           PUBLIC EVENTS
│                                  │ 378 ↘     DIRECTORY
│  CITY      [MOUNTAIN VIEW]       │                    MAXIMUM
│                                  │        [1000]      NUMBER OF
│  STATE  [CA]    ZIP  [94040]     │                    ATTENDEES
│                                  │
│  COUNTRY   [USA]                 │      ┌────────────┐
│                          ── 368  │      │            │
│  ☑ PROVIDE AN ONLINE MAP TO THE VENT ── 369│ FOOTER IMAGE │
│  ☑ PROVIDE ONLINE DIRECTIONS TO THE EVENT│ │    356     │
└──────────────────────────────────┘      │            │
                                          └────────────┘
374 ↘  ☑ LET YOUR GUESTS
          RSVP VIA PHONE ($)   ── 366

INVITE YOUR GUESTS:
ENTER GUEST EMAIL ADDRESSES BELOW OR INVITE GUESTS
FROM ADDRESS BOOK ON NEXT PAGE                    ── 380
┌──────────────────────────────┐ ── 370   ( CONTINUE )
│ BILL@ABCD.COM                │
│ BETTY@XYZ.COM                │
└──────────────────────────────┘
```

FIG. 8

PREVIEW FAX INVITATION

◉ USE ALL THE DELIVERY OPTIONS SELECTED BELOW /582

◉ USE THE LOWEST COST DELIVERY METHOD FROM THE OPTIONS SELECTED BELOW

◉ USE THE GUEST'S PREFERRED DELIVERY OPTIONS ONLY IF SELECTED BELOW:

| | | | | | |
|---|---|---|---|---|---|
| Email (Free): | ☑ | Home Email | ☑ | Business Email | /584 |
| Fax ($): | ☑ | Home Fax | ☑ | Business Fax | |
| Postcard ($): | ☑ | Home Address | ☑ | Business Address | |
| Letter ($): | ☑ | Home Address | ☑ | Business Address | |

SEND INVITATION TO: /586
◉ ALL GUESTS.
◉ SEND TO THE FOLLOWING GROUP OF RECIPIENTS:
  ☑ NEW GUESTS ONLY
  ☑ GUESTS WHO HAVE NOT YET RESPONDED

[CONTINUE]   [CANCEL]

ASK YOUR GUESTS QUESTIONS BEFORE THE EVENT

| TEXT | YES/NO | MULTIPLE CHOICE |

722

Q | EVENT PLAZA |

A | (TEXT) | | |

☑ LET OTHER INVITEES SEE REPONSES TO THIS QUESTION

722

Q | EVENT PLAZA |

A | (TEXT) | | |

☑ LET OTHER INVITEES SEE REPONSES TO THIS QUESTION

724

726  Q | EVENT PLAZA | 722

A | (TEXT) | | |

☑ LET OTHER INVITEES SEE REPONSES TO THIS QUESTION

728

730

732

[ASK MORE QUESTIONS]

FOR MULTIPLE CHOICE QUESTIONS, ENTER
THE POSSIBLE ANSWERS IN THE TEXT BOX
AND SEPARATE THEM WITH COMMAS.

EXAMPLE: | CHICKEN, BEEF, OR FISH |

CLICK X TO REMOVE QUESTIONS FROM THE
LIST.

736            738

[CONTINUE]    [CANCEL]

FIG. 17

INVITE MORE GUESTS

INVITE GUESTS TO YOUR EVENT AND SELECT DELIVERY OPTIONS BELOW. CLICK THE CONTINUE BUTTON AT THE BOTTOM OF THIS PAGE AFTER YOU HAVE FINISHED.

/ 762

ALL
A B C D E F G H I J K L M N O P Q R S T U V W X Y Z

☑ SELECT ALL | LAST NAME | FIRST NAME | INVITED DATE | RSVP |

/ 763

[UNINVITE SELECTED GUESTS]

SELECT GUESTS: / 764
INVITE GUESTS FROM YOUR ADDRESS BOOK
INVITE GUESTS FROM: [ALL CONTACTS ▼]

/ 768
[INVITE SELECTED CONTACT GROUP]

INVITE GUESTS (TYPE IN GUEST Email ADDRESSES BELOW SEPARATE BY COMMA, SEMICOLON, SPACE OR CARRIAGE RETURN) / 770

[text box]

SEND INVITATIONS TO: / 766
◉ ALL GUESTS
◉ THE FOLLOWING GROUP OF RECIPIENTS:
  ☑ NEW GUESTS ONLY
  ☑ GUESTS WHO HAVE NOT YET RESPONDED

/ 772
DELIVERY OPTIONS:
CLICK HERE IF YOU WANT TO SEND INVITATIONS BY FAX, POSTCARD, OR LETTER

☑ ALSO SEND AN INVITATION TO MYSELF

☑ THIS EVENT IS BY INVITATION ONLY

☑ LIST THIS EVENT ON PUBLIC EVENT'S DIRECTORY

☑ ALLOW INVITEES TO SEE WHO HAS BEEN INVITED AND WHO WILL ATTEND

☑ OFFER AUTOMATED TELEPHONE RESPONSE REGISTARTION ($)

☑ ALLOW INVITED GUESTS TO FORWARD INVITATION TO OTHER PEOPLE

/ 774  / 776
[CONTINUE]  [CANCEL]

SET UP TICKETING

SET UP TICKETING OPTIONS FOR YOUR EVENT BELOW. CLICK THE CONTINUE
BUTTON AFTER YOU HAVE FINISHED.

/ 854

[CONTINUE]

/ 852

SELL TICKETS TO YOUR EVENT:

/ 856

(•) THIS IS A FREE EVENT
(○) I WISH TO CHARGE FOR THIS EVENT (FILL
     OUT THE REST OF THE FORM BELOW)

[☑] INDICATE THIS TICKET IS "FREE" ON THE INVITATION

CONVENIENCE FEE: A CONVENIENCE FEE WILL BE CHARGED FOR
EACH TICKET PROCESSED

/ 858    / 890

(•) PAY THIS CONVENIENCE FEE FROM     (○) PASS THIS CONVENIENCE FEE TO
    YOUR PROCEEDS OF TICKET SALES          YOUR CUSTOMERS

PURCHASE DEADLINE: SET DEADLINE FOR
DISCOUNTED EARLY TICKET PURCHASES:

ALL TICKETS MUST BE PURCHASED BY:

VIEW
CALENDAR

/ 892

[JUN ▼] [22 ▼] [2000 ▼]

TICKETS: ASSIGN TICKET NAMES, PRICES AND DESCRIPTIONS. CLICK THE
CALCULATE BUTTON BELOW TO CREATE THE TICKET

/ 896
/ 894

TICKET NAME: [          ]    TICKET DESCRIPTION: [          ]

/ 898

| | LAST DAY TO BUY | TICKET PRICE | CONVENIENCE FEE | TOTAL CUSTOMER COST | ORDER PROCESSING FEE | YOUR REVENUE |
|---|---|---|---|---|---|---|
| STD. PRICE | JUN 22, 2000 | 0 | N/A | N/A | N/A | N/A |

/ 900      / 902

[SET EARLY PRICING]    [CALCULATE]

STATUS [NEW]

/ 910      / 912

[CONTINUE]    [CANCEL]

FIG. 23

EVENT PLANNING SYSTEM

CROSS REFERENCE TO RELATED APPLICATIONS

This is a continuation of U.S. application Ser. No. 09/597,969, filed Jun. 20, 2000, now abandoned which claims the benefit of U.S. Provisional Application No. 60/140,525, filed Jun. 22, 1999, both of which are hereby incorporated by reference herein.

BACKGROUND OF THE INVENTION

1. Field of the Invention

The present invention relates generally to computer systems and methods for planning and organizing events, and more specifically to an event planning system providing an interface allowing a user, that is an event planner, to organize events and manage information associated with the events.

2. Description of the Prior Art

With the advent of computer networking, many different types of scheduling applications have been developed to allow network users and managers to share information indicative of scheduled events and associated time information. Such applications have been primarily developed for use by groups of users (e.g., employees of a corporation) sharing a local area network wherein all of the users communicate with each other using identical, or substantially similar, application programs running on substantially similar computer platforms. As an example Novell, Inc. developed a scheduling application called GROUPWISE. However such systems require execution of custom software on each computer, specialized hardware, and often operate within limited proscribed network environments. As another example, Microsoft Outlook provides for Email communications wherein a first user running Outlook can send an invitation to a second user running Outlook, the invitation requesting that the second user respond to the invitation. Outlook and GROUPWISE provide many useful functions for facilitating the scheduling of planned events. However, such systems fall far short of fulfilling a need in the art for technology that coordinates myriad schedules, and facilitates event planning with people in disparate locations, time zones, and computing environments.

Another problem associated with conventional event planning systems is that no functions are provided for assisting an event planner in financing the planned event. In many cases, event planners are not able to finance an event (i.e., paying fees for the venue, goods, and services associated with the planned event) without soliciting and receiving RSVP fees from invited guests before the event takes place. Particularly in the case of large and costly events, the tasks associated with planning an event can be very difficult and very time consuming. Such event planning tasks include planning the event, identifying and contracting with venue providers and vendors for the event, inviting guests, soliciting RSVP fees from invitees who respond affirmatively, receiving the RSVP fees, tracking RSVP status of each invited guest, tracking and managing RSVP accounts generated by the RSVP fees, and sending guest reminders. None of the prior art scheduling systems referred to above provide any functions for these event planning tasks.

What is needed is an event planning system that obviates the need for special software programs to be purchased by end users, and which allows end users to read invitations in any computing environment.

What is also needed is an event planning system providing an interface allowing an event planner to organize events and manage information associated with the events wherein the event planner and at least some of the invitees communicate via disparate data hosts running on disparate computer platforms.

What is further needed is an event planning system that facilitates event planning tasks including planning an event, identifying and contracting with venue providers and vendors for the event, inviting guests, soliciting RSVP fees from invitees who respond affirmatively, receiving the RSVP fees, tracking RSVP status of each invited guest, tracking and managing RSVP accounts generated by the RSVP fees, and sending guest reminders.

SUMMARY OF THE INVENTION

It is an object of the present invention to provide an event planning system that allows for sending invitations which may be viewed by participating end users in a standard Web Browser in order to obviate the need for special software programs to be purchased by end users, and to allow end users of any CPU type to read their invitations.

It is also an object of the present invention to provide an event planning system that facilitates event planning tasks including planning an event, identifying and contracting with venue providers and vendors for the event, inviting guests, soliciting RSVP fees from invitees who respond affirmatively, receiving the RSVP fees, tracking RSVP status of each invited guest, tracking and managing RSVP accounts generated by the RSVP fees, and sending guest reminders.

Briefly, a presently preferred embodiment of the present invention provides an event planning process executed by a server system in a computer network including a plurality of user terminals communicatively coupled with the server system via the network. The process includes the steps of: providing an event planning graphical user interface at a user terminal, the interface enabling a user to plan an event; receiving event information input by the user, the event information indicating a scheduled event, at least one invitee to be invited to the scheduled event, and information indicative of RSVP fees required to attend the scheduled event; providing an invitation to the invitee, the invitation indicating the scheduled event and the RSVP fees, and soliciting a response to the invitation, wherein an affirmative response to the invitation requires a payment as defined by the RSVP fees; receiving RSVP status information including payment information from the invitee; and verifying the payment information.

The of providing an event planning graphical user interface at the user terminal preferably includes generating at least one event planning Web page that is accessible at the user terminal via the network, the event planning Web page including embedded code for providing the event planning graphical user interface.

The steps of providing an invitation to the invitee and receiving RSVP status information further include: generating an invitation Web page based on the event information, the invitation Web page being accessible via the network and being operative to provide an invitation response graphical user interface for enabling the invitee to respond to the invitation; sending an invitation message to the invitee, the invitation message prompting the invitee to view the invitation Web page; and receiving input provided by the invitee via the invitation Web page, the input provided by the invitee indicating the RSVP status information. In accordance with several aspects of the present invention, the step of sending an invitation message to the invitee may include: sending an Email message via the network to the invitee at a second user terminal, the Email invitation including a link to the invitation Web page; sending a fax invitation message to the invitee via the telephone system, the fax invitation including a universal resource locator for accessing the invitation Web page via the network; and/or sending a post card to the invitee, the post card providing a universal resource locator for accessing the invitation Web page via the network.

In accordance with another aspect of the present invention, the server system is communicatively coupled with an interactive voice response system that is connected to a plain old telephone system, the interactive voice response system being configured to enable the invitee to provide the RSVP status information in response to the invitation. If selected, the RSVP status information may be received at the server system via the interactive voice response system.

In accordance with another aspect of the present invention, a plurality of invitation templates are provided, each template being associated with a different type of event and having at least one associated graphical image. Information indicative of a selected one of the templates is received, and an invitation Web page is generated based on the selected template, the invitation Web page displaying the associated graphical image.

The user may specify that the scheduled event is to be listed in a public events directory. If so, a link to the invitation Web page is provided from a home page Web page that is accessible via the network, the invitation Web page allowing anyone who accesses the invitation Web page to RSVP for the scheduled event.

The event planning graphical user interface allows the user to indicate a schedule for sending reminders to invited guests, and reminder messages are then to the invitees in accordance with the schedule. The event planning graphical user interface also allows the user to specify a question for the invitee in which case the invitation Web page provides interface components enabling the invitee to provide a response to the question. If allowed by the user, the invitation Web page may be configured to enable other invitees to view the response. If allowed by the user, the invitation Web page may also be configured to enable the invitee to view information indicating other invitees associated with the planned event, and RSVP status information associated with each of the other invitees.

In accordance with yet another aspect of the present invention, invitees may post messages and comments regarding the event on the invitation Web page, and the user may specify that all of the posted messages and comments may be viewed by all other invitees, or only by the user.

The event planning graphical user interface also enables the user to specify ticket pricing information indicating a price of at least one type of ticket being offered for admission to the scheduled event. Convenience fees to be paid to administrators of the server system are determined based on sales of the tickets to the invitees. The user may specify whether the convenience fees are to be paid from proceeds of ticket sales, or whether the convenience fees are to be passed on to invitees.

The user may select an option of viewing event summary information associated with a selected event, the event summary information including RSVP status information associated with each of the invitees for the selected event. The user may also select an option of viewing event report information associated with the selected event, the event report information including RSVP fee status information and convenience fee information associated with each of the invitees for the selected event.

An important advantage of the event planning system of the present invention is that it allows for sending invitations which may be viewed by participating end users in a standard Web Browser in order to obviate the need for special software programs to be purchased by end users, and to allow end users of any CPU type to read their invitations.

Another important advantage of the event planning system of the present invention is that it facilitates event planning tasks including identifying and contracting with venue providers and vendors for the event, inviting guests, soliciting RSVP fees from invitees who respond affirmatively, receiving the RSVP fees, tracking RSVP status of each invited guest, tracking and managing RSVP accounts generated by the RSVP fees, and sending guest reminders.

The foregoing and other objects, features, and advantages of the present invention will be apparent from the following detailed description of the preferred embodiment which makes reference to the several figures of the drawing.

IN THE DRAWING

FIG. 8 is a block diagram illustrating a Web page enabling a user to create invitations;

FIG. 13 is a block diagram generally illustrating an invitation delivery option Web page enabling the user to specify a method of delivering an invitation message to an associated invitee;

FIG. 17 is a block diagram generally illustrating a Web page enabling the user to specify questions to be asked of invited guests;

FIG. 19 is a block diagram generally illustrating a Web page enabling the user to invite more guests to the planned event;

FIG. 23 is a block diagram generally illustrating a ticket setup Web page generated by the event planning system;

DETAILED DESCRIPTION OF THE PREFERRED EMBODIMENTS

Figure 1A:
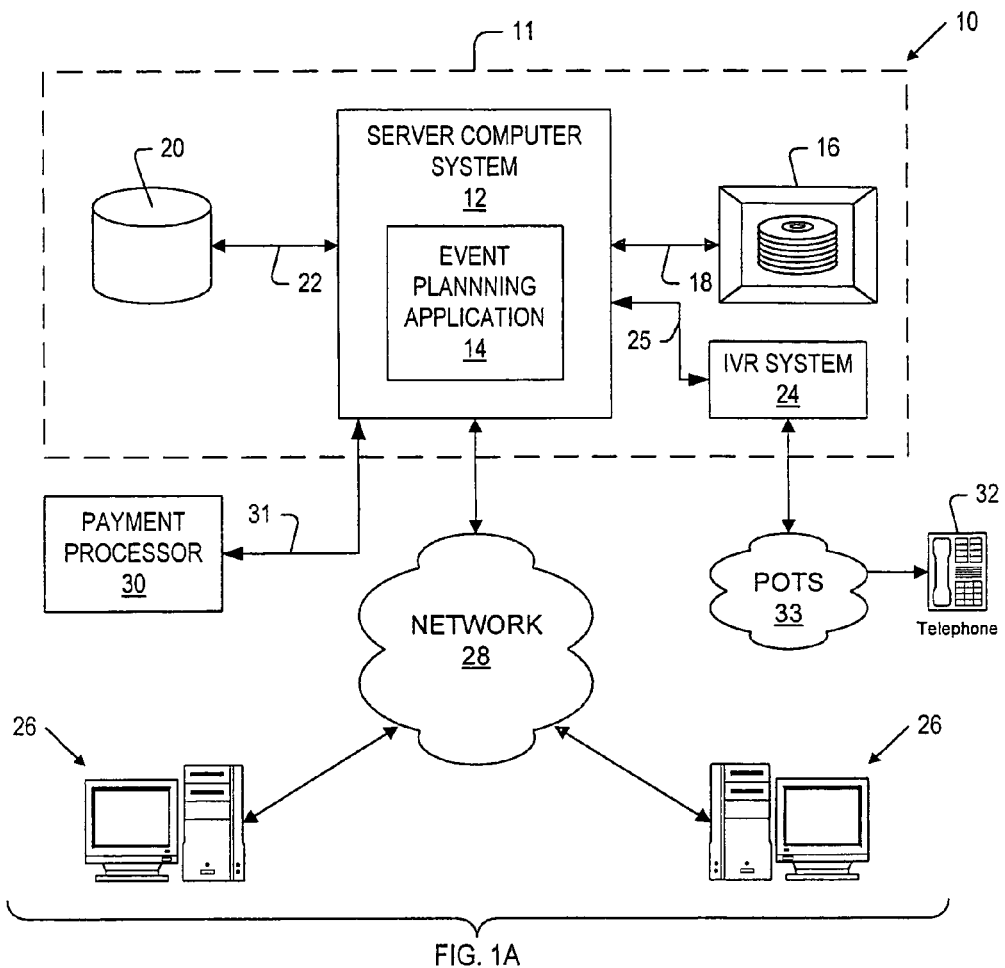
FIG. 1A is a schematic block diagram illustrating an event planning network system in accordance with the present invention, the system including a server system, and a plurality of user terminals communicatively coupled with the server system via a network.

FIG. 1A shows a schematic block diagram illustrating an event planning network system at 10 in accordance with the present invention. The system 10 includes an event planning server system 11 having: a server computer system 12 for executing an event planning application 14 that is operative to enable a user to plan an event, generate and send invitations, track RSVP status, and manage RSVP fee account information as further explained below; an event planning information database 16 communicatively coupled with the server computer system 12 as shown by a line 18 for storing event planning information; a memory unit 20 communicatively coupled with the server computer system 12 as shown by a line 22, and providing for storage of a directory of graphical indicia including image data associated with each of a plurality of images in accordance with the present invention, the images to be selected by users for creating invitation Web pages as further explained below; and an interactive voice response system (IVR system) 24 communicatively coupled with the computer system 12 as shown by a line 25, the IVR system enabling an invited guest to RSVP, for a planned event using a telephone as further explained below. The system 10 further includes: at least one user terminal 26 communicatively coupled with the server system 11 via a computer network 28; a payment processor system 30 communicatively coupled with the server system 11 via a communication link 31; and at least one telephone 32 communicatively coupled with the IVR system 24 of the event planning server system via a plain old telephone system (POTS) 33. In one embodiment, the network 28 is an internet protocol (IP) network. In an alternative embodiment of the present invention, the network 28 is a local are network (LAN). Also in an embodiment, the communication link 31 is a T1 line. In an alternative embodiment, the payment processor system 30 is communicatively coupled with the event planning server system 11 via the network 28.

Figure 1B:
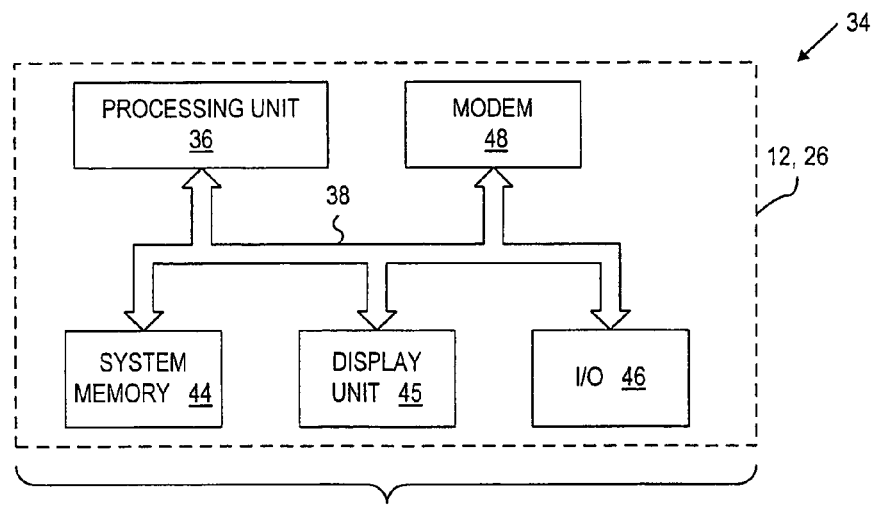
FIG. 1B is a schematic block diagram illustrating an exemplary general purpose computer system which may be used to implement the server system and each of the user terminals of FIG. 1A.

FIG. 1B shows a schematic block diagram illustrating an exemplary general purpose computer system at 34 which may be used to implement the event planning server system 11 and each of the user terminals 26 (FIG. 1A). The computer system 34 includes: a processing unit 36 communicatively coupled to a bus 38; a system memory unit 44, such as a hard disk or other memory storage device, communicatively coupled to the processing unit via the bus; a display unit 45, such as a cathode ray tube or a flat panel display, communicatively coupled to the bus for displaying graphical calendar information as further explained below; an input/output unit (I/O unit) 46, such as a keyboard or mouse, coupled with the processing unit via the bus, and providing an interface for the user to provide input; and a modem 48 coupled with the bus, and providing communication with remote devices via the network 28 (FIG. 1A).

As further explained below, the information stored in the database 16 (FIG. 1A) includes event planning information associated with each of a plurality of events. The event planning information generally includes: event information indicative of a name, time, date, and location for a planned event; invitee information including information indicative of addresses of the invited guests (e.g., home and business Email addresses, home and business postal addresses, home and business FAX numbers, and a preferred method of sending invitations); invitation format information; and paid RSVP requirements indicative of RSVP fees required to be paid by each invited guest in order to respond affirmatively to the invitation. The event planning information stored in the database 16 is further explained below.

In one embodiment of the present invention, the system memory unit 44 of the user terminal 26 (FIG. 1A) stores computer readable instructions for implementing a viewing application such as a Web browser (e.g., Netscape Navigator, Microsoft Explorer, or any other Web browser application) for viewing Web pages such as Web pages that are accessible via the network. Also in the described embodiment, the event planning application 14 (FIG. 1A) is operative to provide an event planning graphical user interface (GUI) on the display unit 45 by packaging predetermined Web pages having user interface components encoded therein for transmission to the user terminal 26 via the network 28 (FIG. 1A) and for display on the display unit 45 or one of the user terminals 26 (FIG. 1B).

The user of the user terminal 26 (FIG. 1A) may interface using GUI components provided on the event planning Web pages via the I/O unit 46 (FIG. 1B), such as a keyboard and mouse, to provide user input by activating various buttons and checkboxes, and by entering and editing text as required and prompted by the interface components as further explained below. In the below-described embodiment of the present invention, each of a plurality of interface functions provided by each of the event planning Web pages is implemented using a corresponding interface component selected from a variety of components including radio buttons, checkboxes, drop-down lists, spin buttons, editable text boxes, non-editable text boxes, etc. However, as is well understood by one of ordinary skill in the art, each of the interface components of each of the event planning Web pages described below may alternatively be implemented using other types of interface components. An event planning process of the present invention is generally described below with reference to flow diagrams while a preferred embodiment of the present invention is depicted by block diagrams illustrating Web pages for displaying event planning interfaces, event invitations, and event information status reports in accordance with the present invention.

Figure 1C:
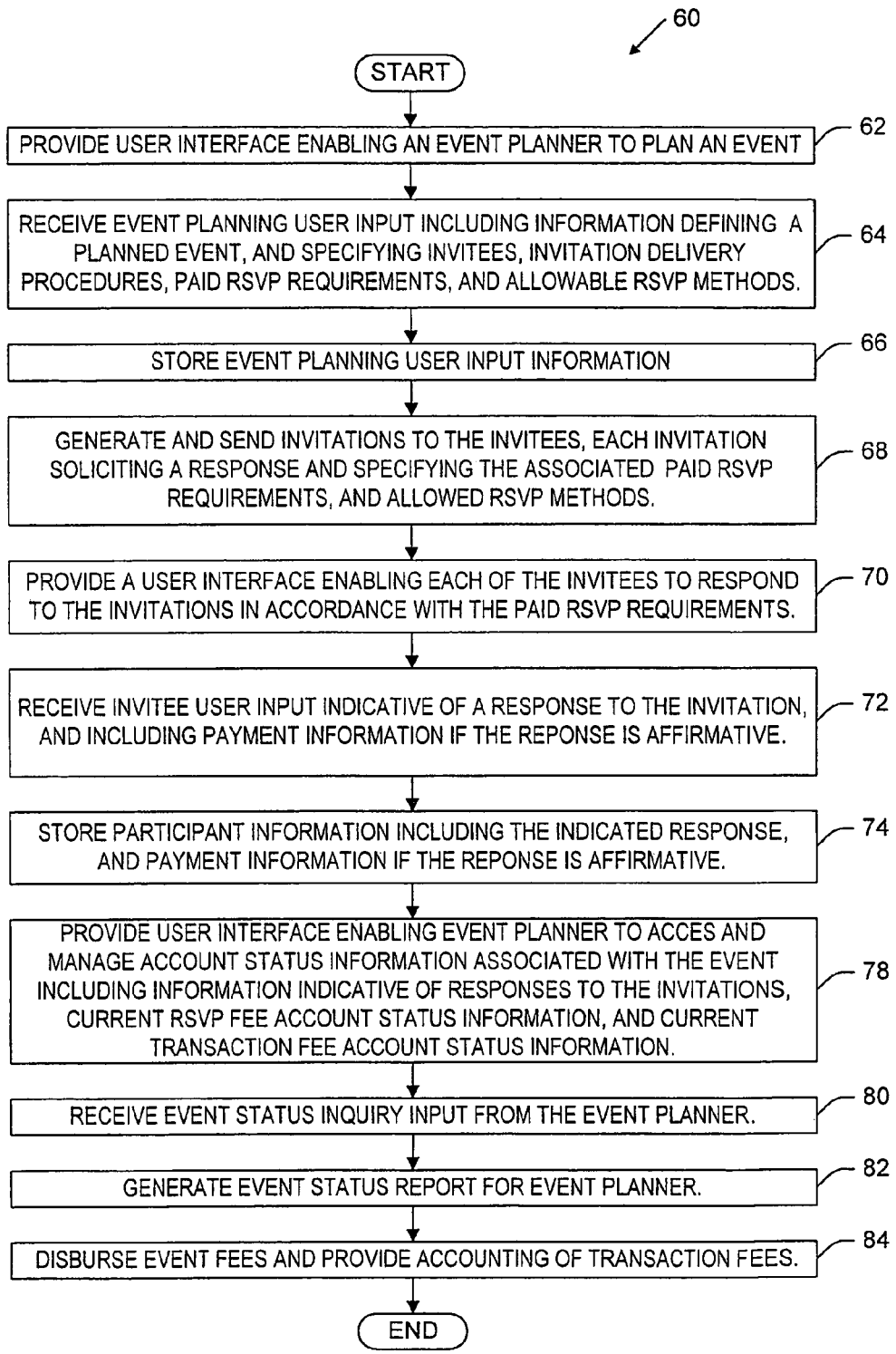
FIG. 1C is a flow diagram generally illustrating an overview of an event planning process executed using the event planning system of FIG. 1A in accordance with the present invention.

FIG. 1C shows a flow diagram generally illustrating an event planning process at 60 executed using the event planning system 10 (FIG. 1A) in accordance with the present invention. The process 60 begins with step 62 in which the event planning server system 11 (FIG. 1A) provides an event planning graphical user interface (GUI) enabling the user to plan an event. In the preferred embodiment, the event planning GUI is provided by generating a series of Web pages which are accessed by users of the terminals 26 (FIG. 1A) and displayed via Web browser type applications as explained above. The event planning GUI prompts the user to specify: event information including information indicative of a name, time, date, and location for a planned event; invited guest information including information indicative of addresses of the invited guests (e.g., home and business Email addresses, home and business postal addresses, home and business FAX numbers, and a preferred method of sending invitations); invitation format information specifying graphical images and text to be displayed on invitations; paid RSVP requirements indicative of RSVP fees required to be paid by each invited guest in order to respond affirmatively to the invitation; invitation delivery mode information specifying preferred delivery methods such as delivery via an Email message having a link to an invitation or event Web page (e.g., a Web page), a FAX invitation, or a post card invitation; and allowable RSVP methods indicating procedures by which an invitee may RSVP for the planned event such as via interaction with the invitation Web page, or IVR registration using the IVR system 24 (FIG. 1A).

From step 62, the process proceeds to step 64 in which the event planning server system 11 (FIG. 1A) receives event planning user input defining the planned event, and specifying information associated with the event including a list of invitees, invitations procedures associated with each of the invitees, paid RSVP requirements, and allowable RSVP methods. As further explained below, the paid RSVP requirements generally define ticket sales offering for attending the event. The user may offer several different categories or tickets for the vent, each ticket costing a different amount.

In step 66, the server computer system executing the event planning application 14 (FIG. 1A) creates records associated with portions of the event planning information (including the planned event, the associated list of invitees, specified invitations, procedures for sending the invitations, paid RSVP requirements, and allowable RSVP methods), and stores the records in the event planning information database 16 as further explained below. From step 66, the event planning process 60 proceeds to step 68 in which the server computer system generates and sends the specified invitations to the specified invitees in accordance with the associated invitation procedures, each invitation soliciting a response and specifying the paid RSVP requirements, and allowable RSVP methods. In one embodiment of the present invention, the event planning server system 11 (FIG. 1A) generates an invitation Web page based on the event planning user input received in step 62 as explained above, and sends Email message invitations to associated invitees. The Email message invitations include links to the associated invitation Web page with which the invitees may interact to RSVP for the event. In accordance with further aspects of the present invention, the user may enable an invitee to forward the invitation to additional invitees who may also RSVP for the event by linking to the invitation Web page. Also, the user may select an option of posting the invitation Web page in a list of public events at the event planning server system 11 (FIG. 1A) thereby enabling any user to access the invitation Web page and RSVP for the event. In accordance with another aspect of the present invention, the user may simply donate an amount to an organization without actually requesting to attend the event.

In step 70, the event planning server system provides user interface components enabling invitees to respond to the invitations in accordance with the specified paid RSVP requirements. In one embodiment, the invitation Web page provides a GUI via embedded HTML commands enabling an invited guest to RSVP for the vent by paying for a selected ticket in accordance with the RSVP requirements specified by the user. The invitation Web page includes user interface components enabling the invitee to select from responses including yes, no, and maybe. If the selected response is "yes", then the invitee will be required to pay to RSVP for the event by online credit card payment processing or any other online payment processing method. Also, if IVR response is enabled by the user, then the IVR system 24 (FIG. 1A) provides an alternative user interface enabling invitees to respond to the invitations in accordance with the paid RSVP requirements.

In step 72, the event planning server system 11 (FIG. 1A) receives invitee user input indicative of a response to the invitation, and including payment information if the response is affirmative. An invitee may interface with the user interface components provided by the invitation Web page to select from responses including yes, no, and maybe. If the selected response is "yes", then the invitee will be required to pay to RSVP for the event by paying for selected ticket(s) via online credit card payment processing or any other online payment processing method. In one embodiment, the server computer system 11 (FIG. 1A) links to the payment processor system 30 (FIG. 1A) to process and Verify a credit card transaction in accordance with well known methods. Note that if IVR RSVP response is enabled, the invitee may also RSVP via the IVR system 24 (FIG. 1A) using a telephone hand set by following IVR response instructions in accordance with well known methods. In step 74, the event planning server system 11 (FIG. 1A) creates records in the database to store the response information, and RSVP fee information associated with the particular invitee. The event planning server system creates and stores event status information including RSVP status information and RSVP fee account status information for all invited guests associated with each planned event. As further explained below, transaction fees are exacted by the event planning system in accordance with convenience fee options released by the user. Therefore, the event planning server system tracks and stores transaction fee account status information as well as RSVP fee account status information.

From step 74, the process proceeds to step 78 to provide user interface components enabling the user to access and manage RSVP status information associated with the event, the account status information including RSVP status information indicative of responses to the invitations, current RSVP fee account status information, and current transaction fee account status information. In the preferred embodiment, the event planning server system 11 (FIG. 1A) provides event summary Web pages providing a graphical user interface via embedded HTML commands and enabling the user to access and manage the RSVP status information. In step 80, the event planning server system 11 receives event status inquiry input from the user in response to the event summary Web pages displayed to the user at the user terminal via a Web browser application. In step 82, the server system generates an event status report for the user, the event status report indicating RSVP status, RSVP fee account status information, and transaction fee account status information for the selected planned event. Further aspects of this step are described in detail below.

Figure 2:
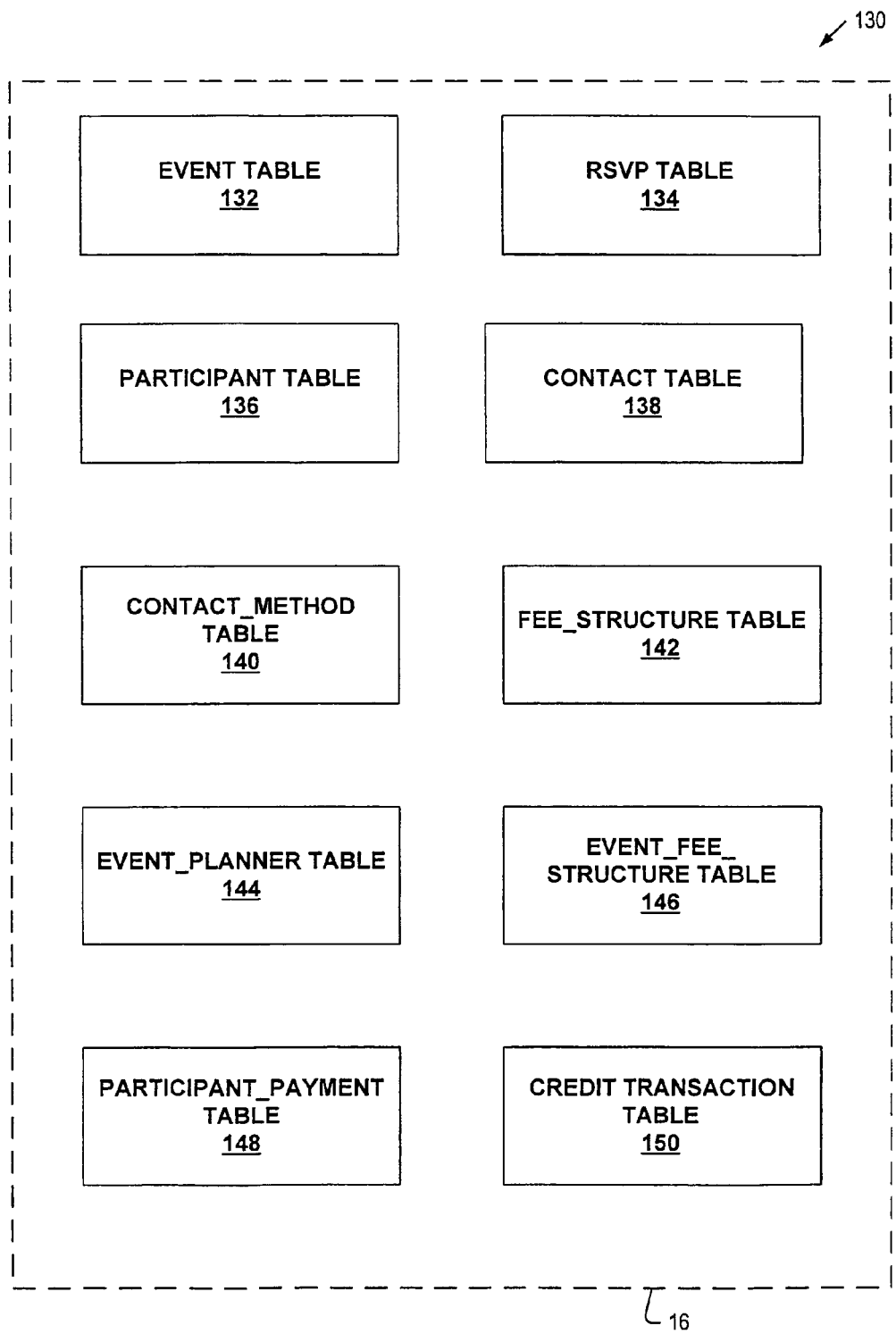
FIG. 2 is a block diagram generally illustrating exemplary tables of information stored in an event planning information database of the server system of FIG. 1A.

FIG. 2 shows a block diagram generally illustrating exemplary tables of information of the event planning database 16 (FIG. 1A) in accordance with one embodiment of the present invention. The below described tables provide an overview of one approach to implementing a database for managing event planning information in accordance with the event planning process described herein. It will be apparent to one skilled in the art that a database for managing the event planning information may be implemented using a wide variety of different table structures. In one embodiment, the database 130 generally includes: an event table 132 including a plurality of event records each being associated with an event planned by an associated user, each event record including information associated with the planned event as further explained below; an RSVP table 134 including a plurality of RSVP records each being associated with one of the guests invited to an associated event; a participant table 136 including a plurality of participant records each being associated with one of the guests invited to an associated event, each participant record including RSVP status information indicating whether an invitation has been sent to the invitee and whether the invitee has accepted or declined the invitation; a contact table 138 including a plurality of contact records each being associated with a particular contact, or potential invitee, known to an associated user, the contact records being used for a variety of functions including providing an address book for the user; a contact method table 140 including a plurality of contact method records each being associated with a particular portion of contact information of the contact table 138 and indicating a preferred method of delivering invitations to the associated contact; a fee structure table 142 including a plurality of fee structure records each being associated with a particular ticket category for an associated event; an event fee structure table 142 including a plurality of event fee structure records each being associated with a particular ticket being offered for an associated event; a user table 144 including a plurality of user records each being associated with a planner of an associated event; a fee structure table 146 including a plurality of fee structure records each being associated with a particular ticket category (e.g., member ticket, non-member ticket, gold member ticket) for an associated event; a participant payment table 134 including a plurality of participant payment records each being associated with a particular invited guest who has elected to RSVP for the associated event by paying the required fee for a particular ticket; and a credit transaction table 150 including a plurality of credit transaction records each being associated with a particular credit transaction for an buying a particular ticket for associated event.

Each record of the event table 132 generally includes: information indicative of a name, time, date, and location for a planned event; invitation format information specifying graphical images and text to be displayed on invitations for the event; paid RSVP requirements indicative of RSVP fees required to be paid by each invited guest for specified ticket(s) in order to respond affirmatively to the invitation; and invitation delivery mode information specifying preferred delivery methods such as delivery via an Email message having a link to an invitation Web page, a FAX invitation, or a post card invitation. Each record of the participant table 136 generally includes: information indicative of whether an invitation has been sent to the associated invitee; and information indicative of how the associated invitee has responded to the invitation (e.g., accept, decline, maybe, etc.).

Each event fee structure record of the table 146 may include information indicative of an "early ticket price", a regular ticket price, and a last day for purchase of the associated ticket at the early ticket price.

Figure 3:
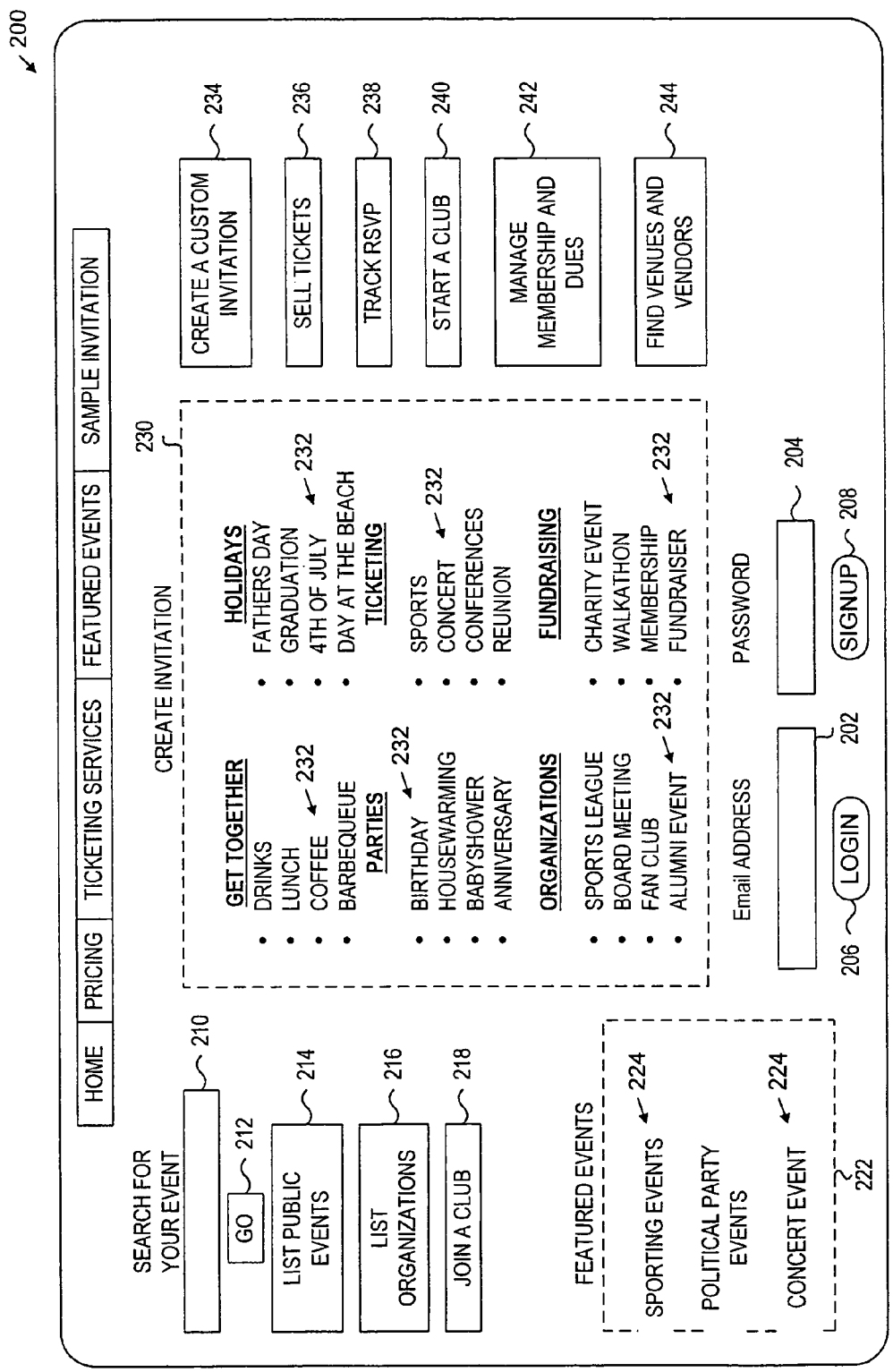
FIG. 3 is a generalized block diagram illustrating a main event planning Web page for providing a graphical user interface (GUI) enabling a user to plan events in accordance with the present invention.

FIG. 3 shows a generalized block diagram illustrating a main Web page at 200 for providing a main event planning graphical user interface Web page at a user terminal. The Web page 200 provides a plurality of log-in graphical user interface (GUI) components 201 at the user terminal enabling the user, or event planner, to log-in to the event planning Web site. The log-in components include: an Email address text box 202 enabling the user to enter a log-in name which, in one embodiment of the present invention, is the user's Email address; a password text box 204 enabling the user to enter or define a password; a log-in button 206 enabling the user to log-in after entering his or her Email address and password; and a sign-up button 208 enabling the user to register with the event planning system after having entered an Email address and password as described above. In one embodiment, the Web page 200 is implemented as a hypertext document. The Web page 200 is transmitted from the server system 11 (FIG. 1A) to one of the user terminals for display by a Web browser application at the user terminal. The main event planning Web page 200 further includes: a text box 210 enabling a pre-registered user to enter a publicly listed event to be searched for, and a "go" button 212 enabling the user to query the server to determine information associated with the event entered in the text box 210; a list public events button 214 which, when activated, enables a function for displaying a list of public events which any user may attend as further explained below; a "list organizations" button 216 enabling the user to activate a function for displaying a list of organizations which the user may join; a button 218 enabling the user to activate a function for joining a club as further explained below; a featured events, display area 222 for displaying an anchor (active text) 224 which, when activated by the user, displays information associated with specific featured public events, that the user may attend; an invitation template display area 230 for displaying a plurality of different types of invitation templates which the user may use to design an invitation in the course of planning an event as further explained below; a custom invitation button 234 enabling the user to activate a function for creating a custom invitation in the course of planning an event; a "sell tickets" button 236 enabling the user to activate a function for defining ticket sales offerings for a planned event as further explained below; a "track RSVP" button 238 enabling the user to activate a function for displaying RSVP status information associated with events previously planned by the user; a "start a club" button 240 enabling the user to activate functions for creating a club which other users may join by paying dues or fees (if any) as defined by the club organizer; a button 242 enabling the user to activate functions for managing membership and dues associated with members of a previously established club which other users have joined; and a button 244 for finding venues and vendors which the user may enlist to supply or provide a venue, goods, or services for an event in the course of planning an event. In one embodiment of the present invention, a user logging on to the event planning Web site who is not yet registered may select from the GUI components 210 through 244 without signing up for the services of the event planning system. In this embodiment, the user may activate the components 210 through 244, and the system displays graphical indicia associated with demonstration functions corresponding with the activated buttons so that the user may get an idea of the type of functions and services offered by the event planning system without actually signing up. Further in this embodiment, the user will be provided with another opportunity to sign up for the services of the event planning system after sampling the types of services offered.

Figure 4:
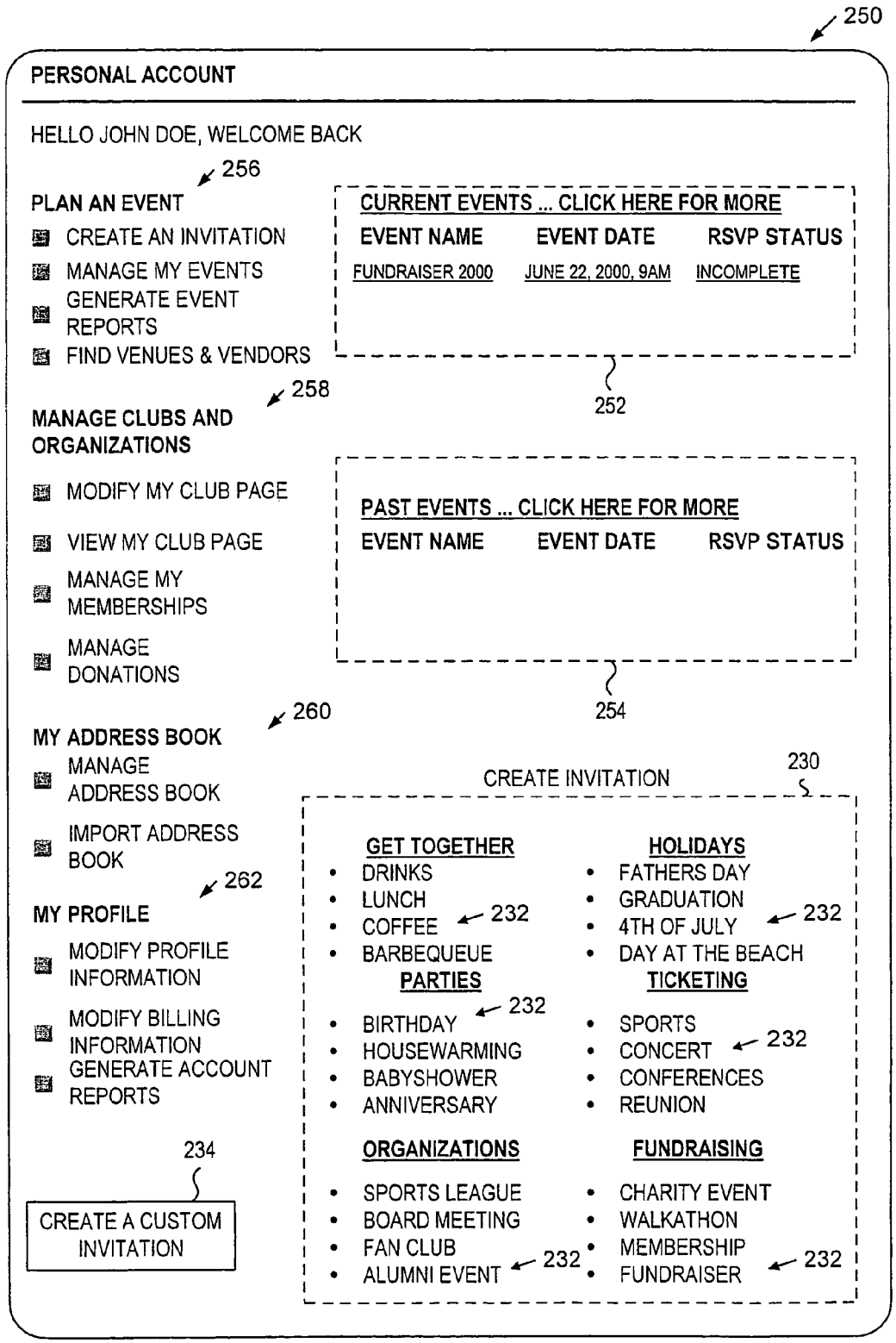
FIG. 4 is a generalized block diagram illustrating a personal event planning account Web page in accordance with the present invention.

FIG. 4 shows a generalized block diagram illustrating a personal event planning account Web page at 250 in accordance with the present invention. In one embodiment, the personal event planning Web page 250 provides a plurality of GUI components enabling the user to plan and manage information associated with that event, manage clubs and organizations, manage a personal address book, and manage profile information associated with the user. The event planning Web page 250 includes: a plurality of event planning buttons 256 which may be implemented as an anchor for initializing a process of creating an invitation in the course of planning an event, a button for initializing a process of managing information associated with previously planned events, a button for generating event reports associated with previously planned events, and a button for initializing a process of displaying and choosing from venues and vendors in the course of planning an event; a plurality of buttons 258 for managing clubs and organizations including modifying a club page, viewing a club page, managing memberships, and managing donations; a plurality of buttons 260 for initializing functions for managing an address book including a list of contacts known to the user; a plurality of buttons 262 for initializing functions for managing a user's profile including buttons for initializing processes of modifying profile information, modifying billing information and generating account reports as further explained below. The personal event planning account Web page 250 further includes: a display area 252 for displaying information associated with a limited number of current or upcoming events previously planned by the user; a past events display area 254 for displaying information associated with each of a limited number of past events that were previously planned by the user and are now past; the invitation templates display area 230 as explained above; and the "custom invitation" button 234 as explained above. Further aspects of the GUI components and associated functions are further explained below.

Figure 5:
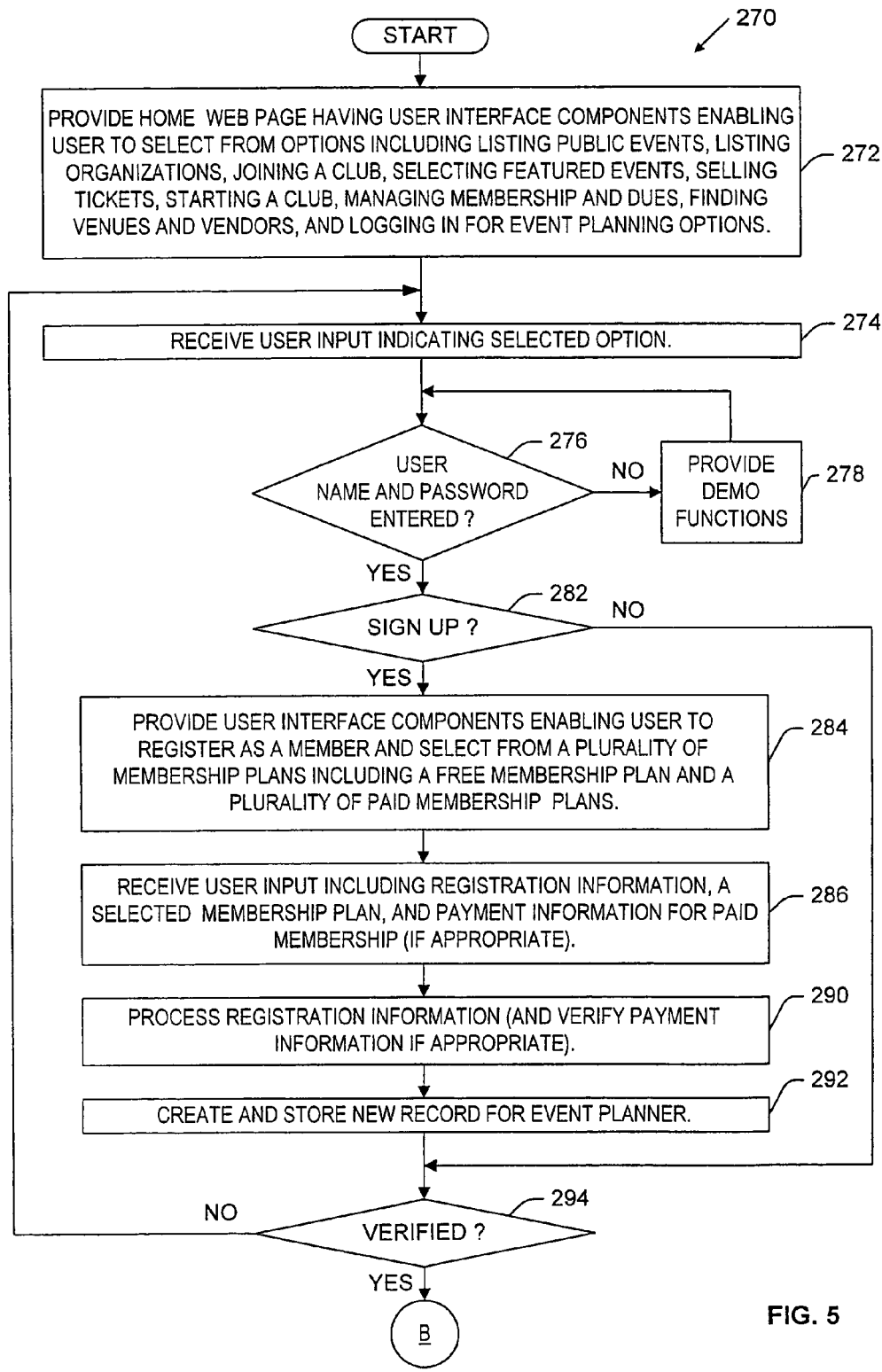
FIG. 5 is a flow diagram illustrating a process of providing a user interface via the main event planning Web page of FIG. 3.

FIG. 5 shows a flow diagram illustrating a process at 270 for generating and displaying the main event planning Web page 200 (FIG. 3). The process 270 begins with step 272 in which the event planning server system 11 (FIG. 1A) provides user interface components enabling the user to select from options including listing public events, listing organizations, joining a club, selecting featured events, selling tickets, starting a club, managing membership and dues for previously defined clubs, finding venues and vendors, and logging in for event planning options. The process 270 is initiated in response to the user linking to and generating the Web page 200 (FIG. 3). In step 274, the event planning system receives user input indicating a selected one of the options provided by the Web page 200 (FIG. 3). It is then determined at 276 whether the user has entered a user name and password at 202 and 204 (FIG. 3).

If the user selects any of the GUI components 210-244 of the Web page 200 (FIG. 3) without logging in, the process proceeds to step 278 to provide demonstration functions for demonstrating the services of the event planning system, after which the user may log in as determined at 276. If it is determined at 276 that the user has entered a user name and password, the process proceeds to step 282 to determine whether the user has activated the sign-up button 208 (FIG. 3) or the login button 206 (FIG. 3). If the user has activated the sign-up button, the process proceeds to step 284 in which the server system provides GUI components enabling the user to request as a member, and allowing the user to select from a plurality of membership plans including a free plan, and several different paid membership plans. In one embodiment, the prices of the paid membership plans vary based on an anticipated number of people who will attend planned events, and also based on whether the user wishes to send fax and post card invitations as further explained below, and whether the user wishes to enable invitees to RSVP via the IVR system 24 (FIG. 1A). In step 286, the server system receives user input including user registration information (e.g. name, billing, address, Email address, credit card information, etc.), information indicating a selected membership plan, and payment information (e.g. credit card information) if the selected membership plan is a paid plan. In step 290, the server system processes the registration information and verifies the payment information, if appropriate. In step 292, the server system creates new records for the new user and stores the records in the data base 16 (FIG. 1A) after which the system verifies the user name and password at 294 and then proceeds to "B" (FIG. 6) to display the personal event planning Web page 250 (FIG. 4).

Figure 6:
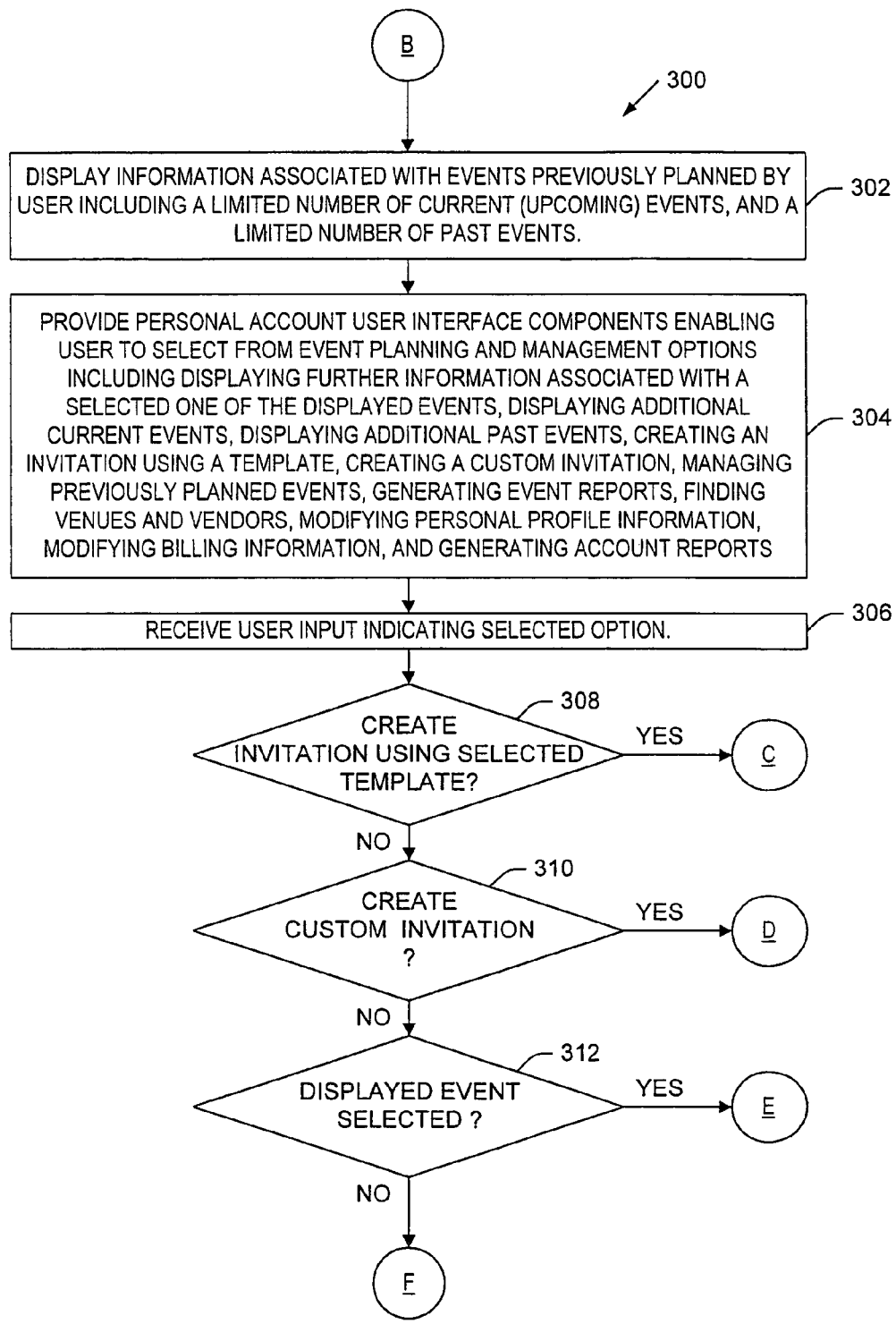
FIGS. 6 and 7 are flow diagrams illustrating a process of providing a user interface via the personal event planning account Web page of FIG. 4.

FIG. 6 shows a flow diagram illustrating a process at 300 for providing the personal event planning account Web page 250 (FIG. 4). The process 300 begins with a step 302 in which the event planning system displays information associated with events previously planned by the user including a limited number of current (upcoming) events, and a limited number of past events. In step 304, the event planning system provides interface components enabling the user to select from event planning and management options including displaying further information associated with a selected one of the displayed events, displaying additional current events, displaying additional past events, creating an invitation using a template, creating a custom invitation, managing previously planned events, generating event reports, finding venues and vendors, modifying personal profile information, modifying billing information and generating account reports. In step 306, the event planning system receives user input indicating a selected one of the options provided in steps 302 and 304. From step 306, the process proceeds to 308 at which it is determined whether the option for creating an invitation using a selected one of the templates 232 (FIG. 4) has been selected, and if so, the process proceeds to "C" (to FIG. 10). It is then determined at 310 whether the user has selected the option of creating a custom invitation by activating the button 234 (FIG. 4) of the personal event planning account Web page, and if so, the process proceeds to "D" (to FIG. 10). It is determined at 312 whether the user has selected one of the displayed events current or past events displayed in areas 252 and 254 of FIG. 4 previously planned by the user and displayed on the personal event planning account Web page 250 (FIG. 4). If it is determined at 312 that the user has selected one of the displayed events, the process proceeds to "E" (to FIG. 26). Otherwise, the process proceeds to "F" (to FIG. 7).

Figure 7:
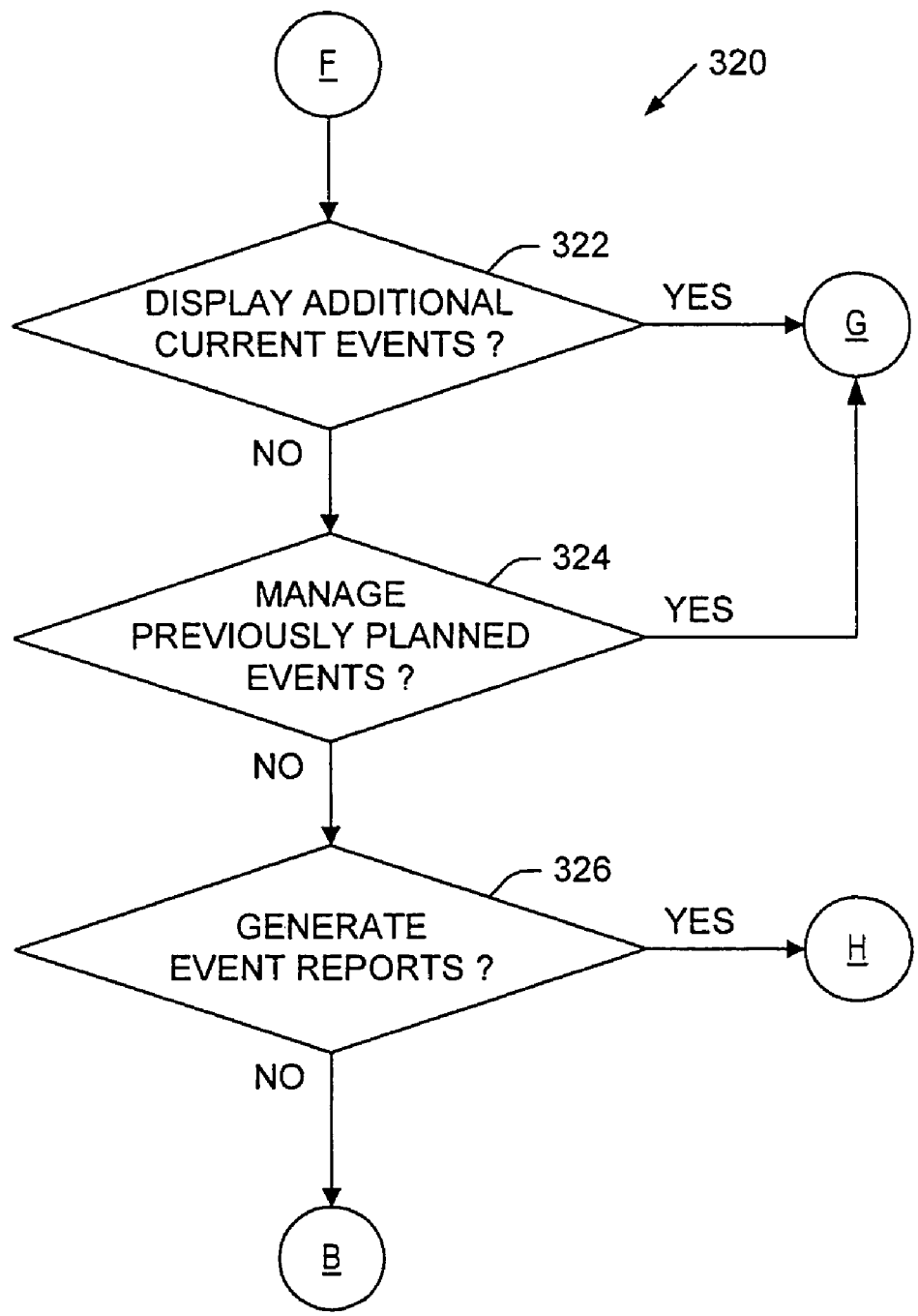

FIG. 7 shows a flow diagram generally illustrating further steps at 320 of the process 300 (FIG. 6). The steps at 320 proceed from "F" (from FIG. 6) to 322 at which the event planning system determines whether the user has selected the option of displaying additional current events, and if so, the process proceeds to "G" (to FIG. 28). It is determined at 324 whether the user has selected the option of managing previously planned events, and if so, the process proceeds to "G". It is then determined at 326 whether the user has selected the option of generating event reports, and if so, the process proceeds to "H" (to FIG. 30). If the user has not selected any of the above options, the process proceeds back to "B" (to FIG. 6).

FIG. 8 shows a block diagram illustrating an invitation creation Web page 350 that is generated by the event planning server system 11 (FIG. 1A) in response to the user activating either one of the invitation template buttons 232 (FIG. 3) or the custom invitation button 234 (FIG. 3) of the main event planning Web page. The Web page 350 includes: a plurality of invitation image display areas including a header image display area 352, a main image display area 354, and a footer image display area 356 each for displaying an associated graphical image selected by the user for the associated invitation. If the invitation creation Web page 350 is generated in response to the user selecting one of the invitation templates 232 (FIG. 3), then each of the image display areas 352, 354 and 356 will have an associated template graphical image displayed therein. The invitation creation Web page 350 further includes: an event name text box 358 enabling the user to enter a name for the planned event; a salutation text box 360 that defaults to text stating "You have been invited to . . . ", and enabling the user to enter any salutation for inviting guests to the event; interface components 362 enabling the user to define a date and time for the planned event; duration interface components 364 enabling the user to specify a duration in minutes, days or open-ended for the planned event; location interface component 366 enabling the user to define a location for the planned event; and check boxes 368 which, when activated, provide the capability of providing an online map to the invited guest for the event; a check box 369 which, when activated, enables a capability of providing online directions to the invited guests for the event; a text box 370 enabling the user to enter Email addresses for invited guests who are to receive invitations via Email; a text box 372 enabling the user to enter text indicative of the nature of the event, such as "dinner and fund raiser"; a check box 374 which, when activated by the user, allows for invited guests to RSVP via telephone as further explained below; a check box 376 which, when activated, provides for the planned event to be listed in the public events directory which is accessible to all users via the main event planning Web page 200 (FIG. 3) by activating the list public events button 214 (FIG. 3); a text box 378 enabling the user to enter a maximum number of attendees who may attend the planned event; and a continue button 380 which provides for the invitation creation Web page 350 to be sent from the user terminal 26 (FIG. 1A) to the event planning server system via the network.

Figure 9:
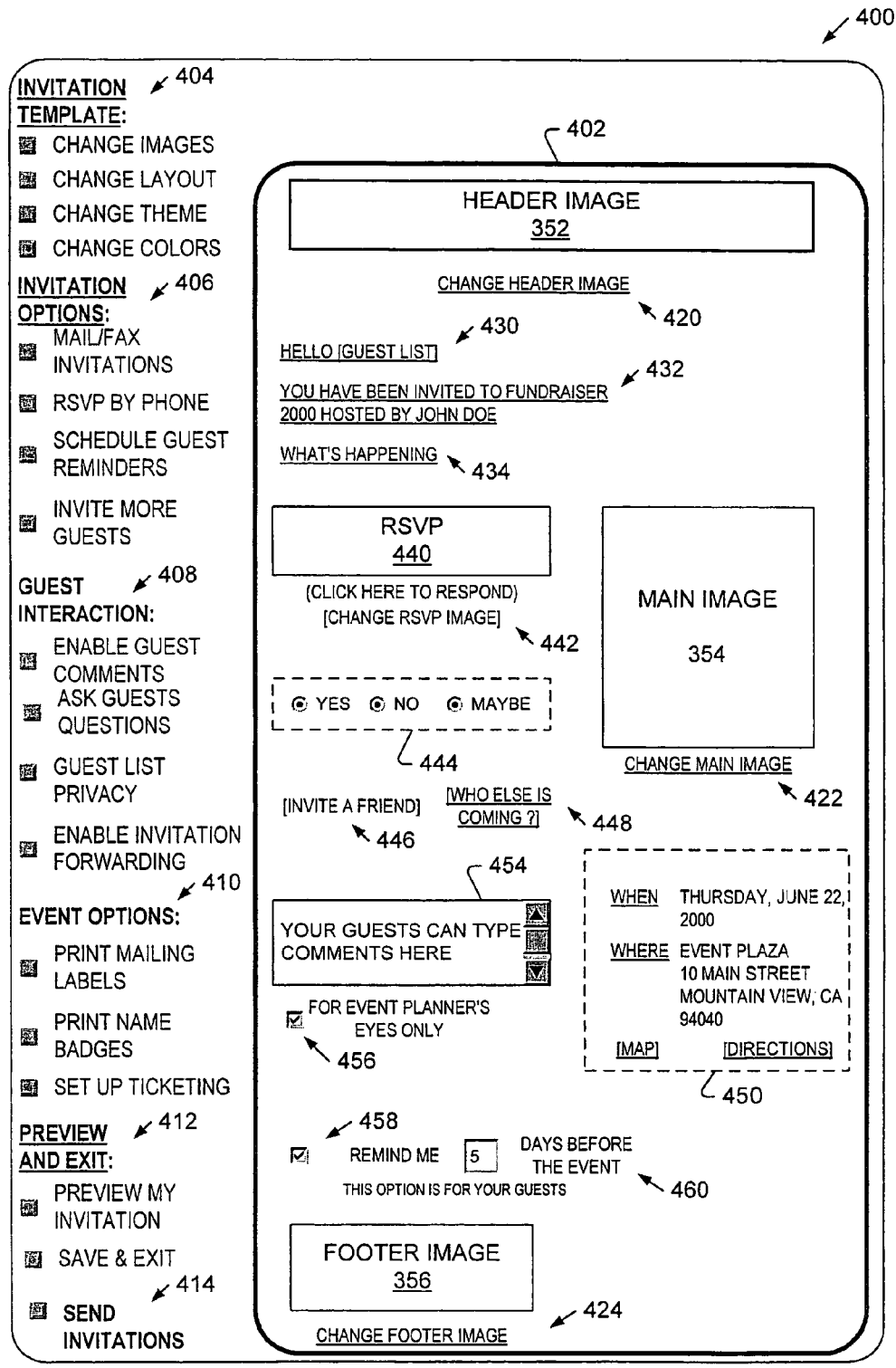
FIG. 9 is a block diagram generally illustrating a Web page providing a preview of an invitation, and enabling the user to edit the invitation.

FIG. 9 shows a block diagram generally illustrating an invitation preview Web page 400 generated by the event planning system in response to receiving event planning information provided via the Web page 350 (FIG. 8). The invitation preview Web page 400 includes: an invitation preview display area 402 for displaying a preview of an invitation that is filled in with information provided by the user via the invitation creation Web page 350 (FIG. 8); invitation template format modification buttons 404 for enabling the user to change format parameters associated with the invitation such as images (displayed in the display areas 352, 354, and 356), layout, theme and colors; a plurality of invitation options buttons 406 including a button enabling the user to specify whether some invitations are to be sent via mail or fax as further explained below, a button enabling the user to specify that guests may RSVP via telephone as further explained below, a button enabling the user to schedule delivery of guest reminders as further explained below, and a button enabling the user to invite more guests; a guest interaction button display area 408 for displaying a plurality of buttons which may be activated by the user to specify guest interaction options such as enabling guests comments, asking guests' questions, specifying guest list privacy, and enabling invitation forwarding; an event options button area 410 for displaying a plurality of buttons which may be activated by the user for the purpose of initiating functions for options such as printing mailing labels, printing name badges, and setting up ticketing as further explained below; preview and exit buttons 412; and a send invitations button 414 for initiating the process of sending invitations to specified guests for the planned event as further explained below.

The invitation display area 402 provides a preview of an invitation as thus far designed by the user, as well as GUI components enabling the user to modify the invitation. The invitation preview display area 402 includes: the image display areas 352, 354 and 356 having graphical images associated with a selected invitation template displayed therein (or being blank if the invitation is a custom invitation); a change header image active area 420 for enabling the user to select a function for changing the header image 352; an active area 422 enabling the user to change the main image 354; an active area 424 enabling the user to change the footer image; a guest list active area 430 enabling the user to initiate a function for displaying a guest list as thus far specified; a display area 432 for displaying information including the salutation, event name and host of the planned event; an active area 434 for enabling the user to preview information indicative of what is happening at the planned event; an RSVP image display area 440 for displaying user selected graphical image indicia for RSVP text; an active area 442 enabling the user to initiate a function for changing the RSVP image 440; a guest response user interface area 444 for enabling invited guests to select from invitation response radio buttons for indicating yes, no, and maybe with regard to whether the user will attend the event; an active area 446 allowing the user to enable invited guests to forward the invitation to a friend; an active area 448 enabling the user to initiate a function for defining parameters associated with invitation options for who else is coming; a display area 450 for displaying the event time and location, map, and directions; a text box 454 enabling invited guests to type comments which may be later viewed by the user as further explained below; a check box 456 which, when activated, indicates that comments provided by a guest in the text box 454 are for the user's eyes only as opposed to being accessible by other invitees which is the default option); a check box 458 enabling invited guests to initiate a function for being reminded of the upcoming event a selected number of days before the event; a text box 460 enabling an invited guest to specify the number of days which the invited guest wishes to be reminded of the upcoming event before the upcoming event.

Figure 10:
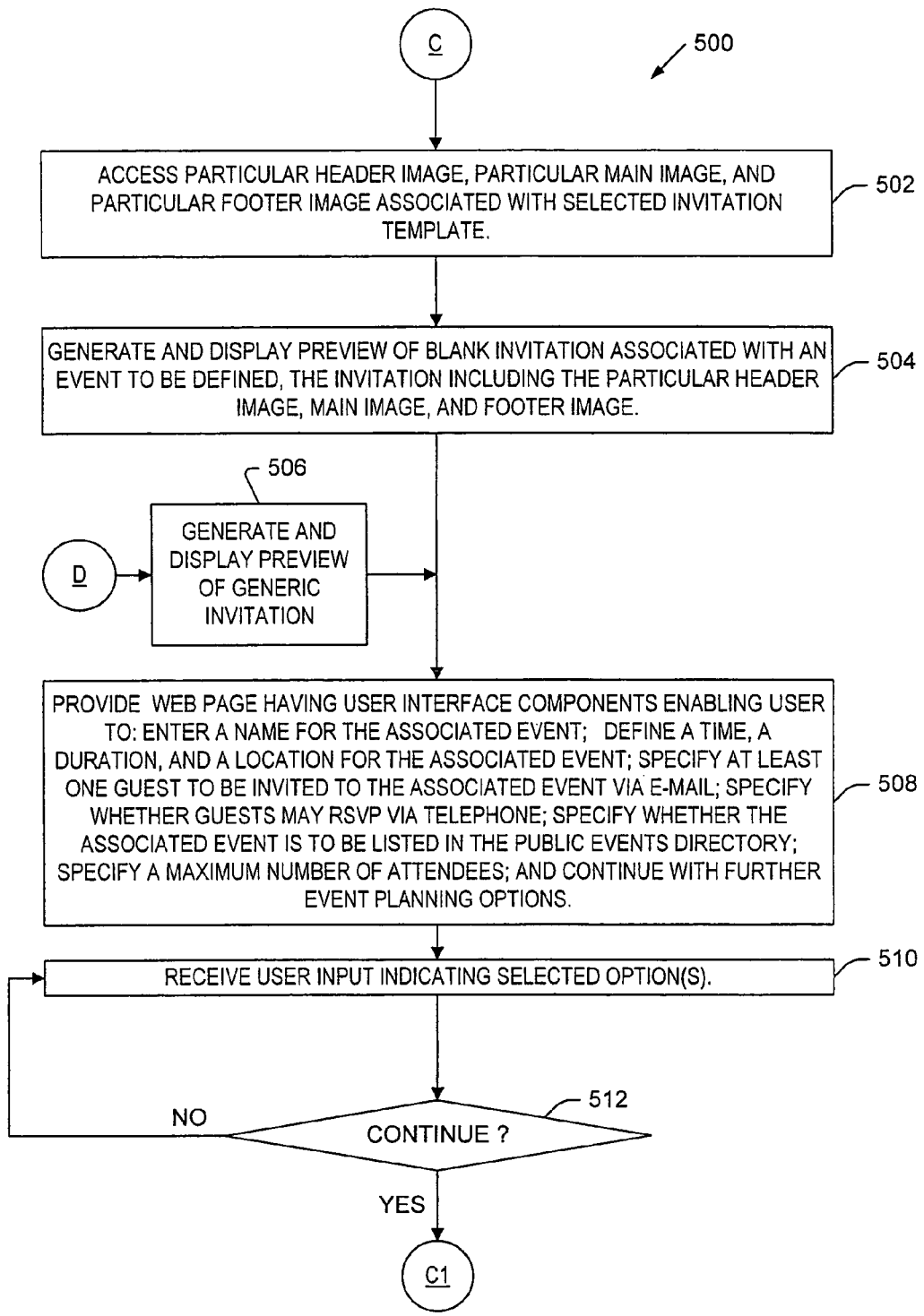
FIG. 10 is a flow diagram generally illustrating an invitation creation process in accordance with the present invention.

FIG. 10 shows a flow diagram generally illustrating an invitation creation process at 500 in accordance with the present invention. The process 500 proceeds from "C" (from FIG. 6), and is initiated in response to the user selecting one of the invitation templates 232 (FIGS. 3 and 4). In step 502, the event planning system accesses a particular one of the header images, a particular one of the main images, and a particular one of the footer images associated with the selected invitation template from the image directory 20 (FIG. 1A) of the event planning server system. From step 502, the process proceeds to step 504 in which the event planning system generates and displays a preview of a blank invitation associated with an event to be defined, the invitation including a particular header image, main image and footer image. From step 504, the process proceeds to step 508 in which the event planning system provides user interface components enabling the user to define parameters associated with the invitation and the event to be planned as further explained below.

The invitation creation process 500 may also be initiated in response to the user selecting the custom invitation button 234 (FIG. 4) for creating a custom invitation as displayed on the main event planning Web page 200 (FIG. 3). In accordance with this function, the process 500 proceeds from "D" (from FIG. 6) to step 506 in which the event planning system generates and displays a preview of a generic invitation in the form of the invitation creation Web page 350 (FIG. 8) wherein the header image 352, main image display area 354, and footer display image 356 are each displayed without any particular images displayed therein.

Regardless of whether the invitation creation Web page was generated in response to selecting an invitation template or selecting a custom invitation, the invitation creation process 500 proceeds to step 508 to provide user interface components enabling the user to perform invitation editing functions including: entering a name for the associated event such as in the event name text box 358 (FIG. 8); defining a time for the planned event such as by using the time interface components 362 (FIG. 8) of the invitation creation Web page; defining a duration such as by using the duration interface components 364 (FIG. 8); defining a location for the associated event such as by using the location interface component 366 (FIG. 8); specifying at least one guest to be invited to the associated event via Email such as by using the text box 370 (FIG. 8); specifying whether guests may RSVP via telephone such as by the check box 374 (FIG. 8); specifying whether the associated event is to be listed in the public events directory such as by the check box 376 (FIG. 8); specifying a maximum number of attendees such as by the text box 378 (FIG. 8); and continuing with further event planning options such as by activating the associated continue button.

From step 508, the process proceeds to step 510 in which the event planning system receives user input associated with selected ones of the options provided in step 508 above. From step 510, the process proceeds to 512 in which it is determined whether the user has activated the continue button 380 (FIG. 8), and if so, the process proceeds to "C1" (to FIG. 11). Alternatively, the process repeats step 510 allowing the user to fill in the information requested in the invitation creation Web page 350 (FIG. 8) until the user activates the continue button.

Figure 11:
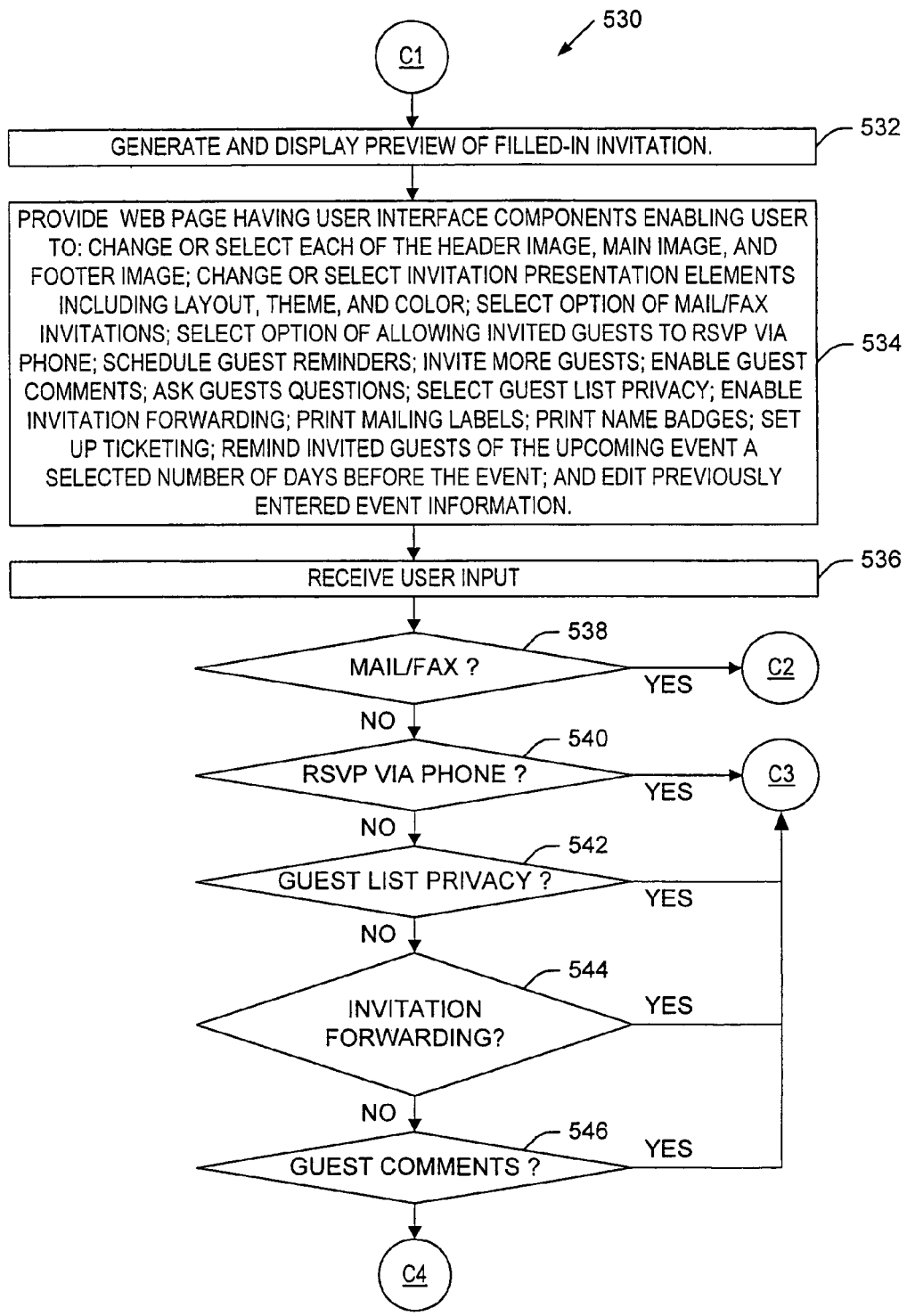
FIGS. 11 and 12 are flow diagrams generally illustrating an invitation previewing and editing process in accordance with the present invention.

FIG. 11 shows a flow diagram generally illustrating an invitation preview generating process at 530 in accordance with the present invention. The process 530 is initiated in response to the user activating the continue button 380 (FIG. 8) of the invitation creation Web page 350 (FIG. 8). The process 530 proceeds from "C1" (from FIG. 10) to step 532 in which the event planning system generates and displays a preview of a filled in invitation. In the preferred embodiment, step 532 is implemented to generate the invitation preview Web page 400 (FIG. 9) which includes the invitation preview display area 402 for displaying a preview of an invitation as specified by information provided by the user in the invitation creation Web page 350 (FIG. 8). From step 532, the process proceeds to step 534 in which the event planning system provides user interface components enabling the user to, change or select each of the header image, main image, and footer image such as by activating one of the active areas 420, 422 and 424 (FIG. 9) of the invitation preview Web page; changing or selecting invitation presentation elements (including layout, theme and color), mailing or faxing invitations to, allowing invited guests to RSVP via telephone, scheduling guest reminders, inviting of more guests, enabling guests' comments, asking guests questions, selecting guest list privacy options, enabling invitation forwarding, printing mailing labels, printing name badges for the planned event, setting up ticketing options associated with a planned event, reminding invited guests of the upcoming event a selected number of days before the event, and editing previously entered event information.

From step 534, the process proceeds to step 536 in which the event planning system receives user input such as via the invitation preview Web page 400 (FIG. 9). From step 536, the process proceeds to 538 at which the event planning system determines whether the user has selected the option of mailing or faxing invitations to guests and if so, the process proceeds to "C2" (to FIG. 14). It is determined at 540 whether the user has selected the option of allowing invited guests to RSVP via telephone, and if so, the process proceeds to "C3" (to FIG. 16). It is determined at 542 whether the user has selected the option of guest list privacy, and if so, the process proceeds to "C3" (to FIG. 16). It is also determined at 544 and 546 whether the user has selected the options of invitation forwarding and guest comments respectively, and if so, the process proceeds to "C3" (to FIG. 16). If none of the options tested for at 538 to 546 has been selected, the process proceeds to "C4" (to FIG. 12).

Figure 12:
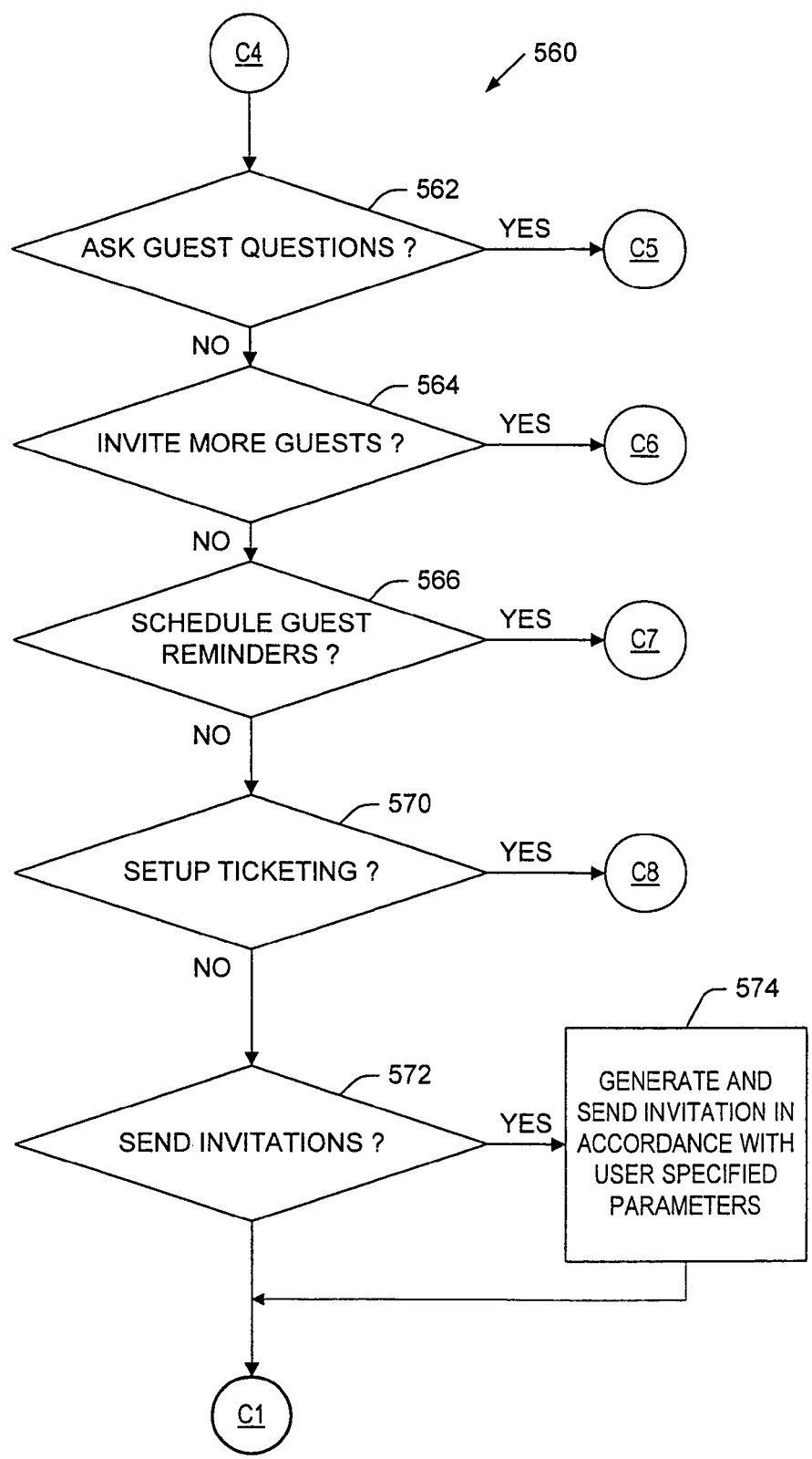

FIG. 12 shows a flow diagram generally illustrating further steps of the invitation preview generating process 530 (FIG. 11). The process 560 proceeds from "C4" (from FIG. 11) to 562 at which the event planning system determines whether the user has selected the option of asking guests questions, and if so, the process proceeds to "C5" (to FIG. 18). At 564, it is determined whether the user has selected the option of inviting more guests, and if so, the process proceeds to "6" (to FIG. 20).

Figure 22:
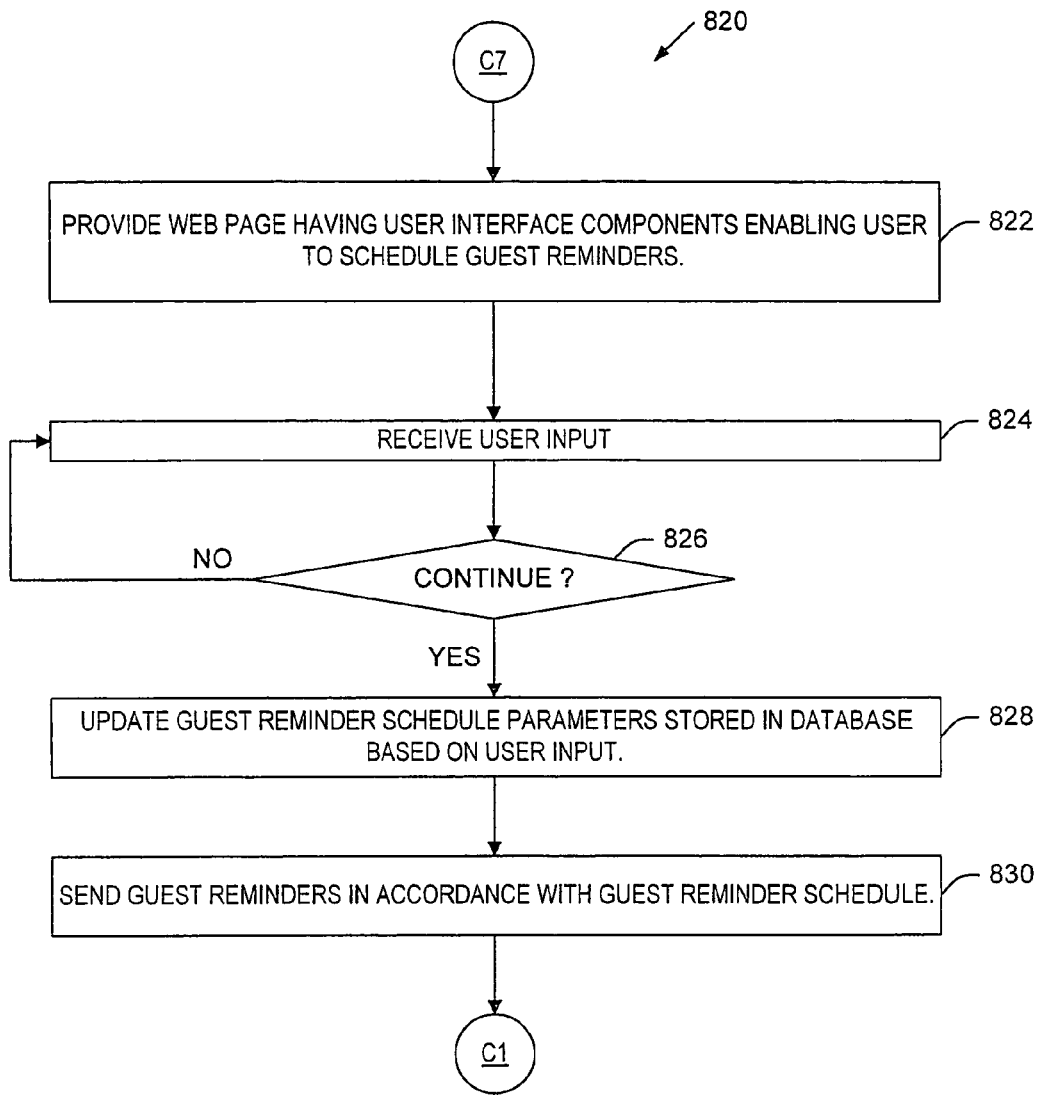
FIG. 22 is a flow diagram generally illustrating a process for enabling an event planner to schedule guest reminders.

It is determined at 566 whether the user has selected the option of scheduling guest reminders, and if so, the process proceeds to "C7" (to FIG. 22). It is determined at 570 whether the user has selected the option of setting up ticketing, and if so, the process proceeds to "C8" (to FIG. 24). It is determined at 572 whether the user has selected the option of sending the invitation as defined, and if so, the process proceeds to step 574 in which the event planning system generates and sends invitations in accordance with the user specified parameters. Otherwise, the process proceeds back to "C1" (to FIG. 11).

FIG. 13 shows a block diagram generally illustrating a mail/fax invitation option Web page at 580 in accordance with one embodiment of the present invention. The event planning server system 11 (FIG. 1A) generates the Web page 580 in response to the user activating the mail/fax invitation option button at 406 (FIG. 9) of the invitation preview Web page. The Web page 580 includes a plurality of radio buttons 582 including: a first radio button for selecting all of a plurality of delivery options selected as further explained below; a second radio button for using a lowest cost delivery method of the selected options; and a third radio button allowing the user to select the option of using a guests' preferred delivery option, only if selected below. The Web page 580 further includes a plurality of check boxes 584 each being associated with a delivery option. The delivery option check boxes 584 include check boxes allowing the user to select delivery options for home E-mail, business E-mail, home fax, business fax, home address, business address for postcard, home address for letter, and home address for business.

The Web page 580 further includes a plurality of interface components allowing the user to specify sending the invitation to all guests, or to a selected group of recipients. The user may specify sending invitations to new guests only, or guests who have not yet responded by selecting an appropriate check box. Information answered via the Web page 580 is provided to the event planning server system by the user activating a continue button.

Figure 14:
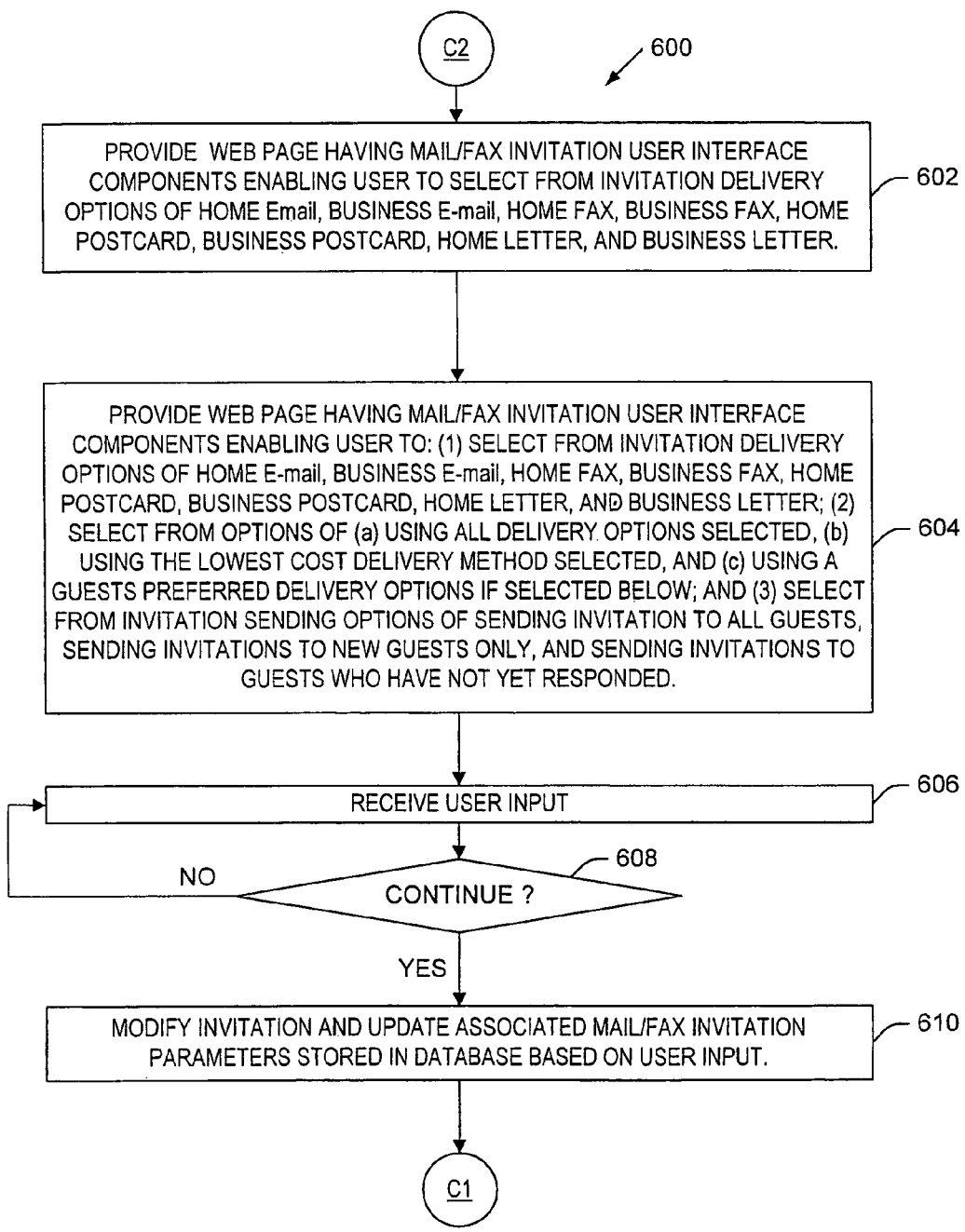
FIG. 14 is a flow diagram generally illustrating a delivery specification process.

FIG. 14 shows a flow diagram generally illustrating a mail/fax invitation delivery specification process at 600 in accordance with the present invention. The process 600 is initiated in response to the user activating the mail/fax invitation option button at 406 (FIG. 9) of the invitation preview Web page. The process 600 begins with a step 602 in which the event planning system provides mail/fax invitation user interface components enabling the user to select from invitation delivery options of home E-mail/business E-mail, home fax, business fax, home postcard, business postcard, home letter, and business letter. In the preferred embodiment, the process 600 is implemented by generating the Web page 580 (FIG. 13). From step 602, the process proceeds to step 604 in which the event planning system provides mail/fax invitation user interface components enabling the user to: (1) select from invitation delivery options of home E-mail, business E-mail, home fax, business fax, home postcard, business postcard, home letter, and business letter; (2) select from options of (a) using all delivery options selected, (b) using the lowest cost delivery method selected, and (c) using a guests' preferred delivery option; and (3) select from invitation sending options of sending invitations to all guests, sending invitations to new guests only, and sending invitations to guests who have not yet responded. In step 606, the event planning system receives user input via the Web page 580 (FIG. 13). It is then determined at 608 whether the user has activated the continue button of the mail/fax invitation delivery option Web page 580, and if so, the process proceeds to step 610 in which the event planning system modifies invitation and update information associated with mail/fax invitation parameters stored in the database 16 (FIG. 1A).

Figure 15:
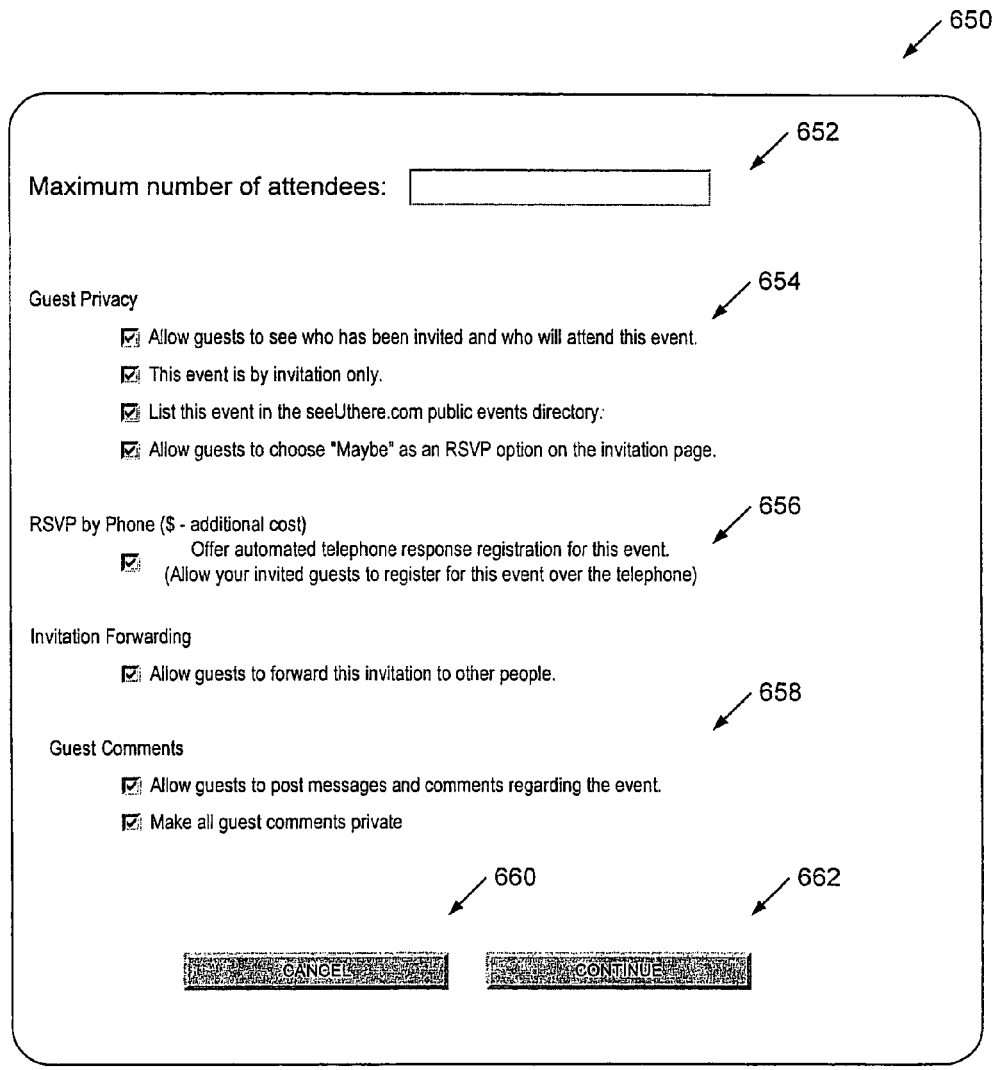
FIG. 15 is a generalized block diagram generally illustrating a Web page enabling the user to select options of enabling RSVP by phone, enabling guests to post comments, enabling guest list privacy, and enabling invitation forwarding.

FIG. 15 shows a generalized block diagram generally illustrating a Web page at 650 that is initiated or provided by the event planning server system in response to the user activating either the RSVP by phone enabling invitation option 406 (FIG. 9), the enable guest comments guest interaction button, the guest list privacy interaction button, or the invitation forwarding enable button 408 (FIG. 9). The Web page 650 includes: a text box at 652 enabling the user to specify a maximum number of attendees for the event; a plurality of guest privacy option check boxes at 654 including a first check box for enabling guests to see who has been invited and who will attend the associated event, a second check box enabling the user to specify that the event is by invitation only, a third check box enabling the user to specify that the event should be listed in the public events directory, and a fourth check box allowing the user to specify or enable guests to choose "maybe" as an RSVP option on the invitation page; a RSVP by phone check box at 656 enabling the user to select the option of enabling invitees to RSVP by phone using the IVR system 24 (FIG. 1A) as explained above; an invitation forwarding check box 658 enabling the user to allow invited guests to forward the invitation to other people; a plurality of guest comments check boxes at 658 including a first check box enabling the user to allow guests to post messages and comments regarding the event, and a second check box enabling the user to make all of the guests' comments private (as opposed to allowing other invited guests to view the guest comments); a cancel button 660 for canceling the entry of information entered via the Web page 650; and a continue button 662 for providing the information entered via the Web page 650 to the event planning server system.

Figure 16:
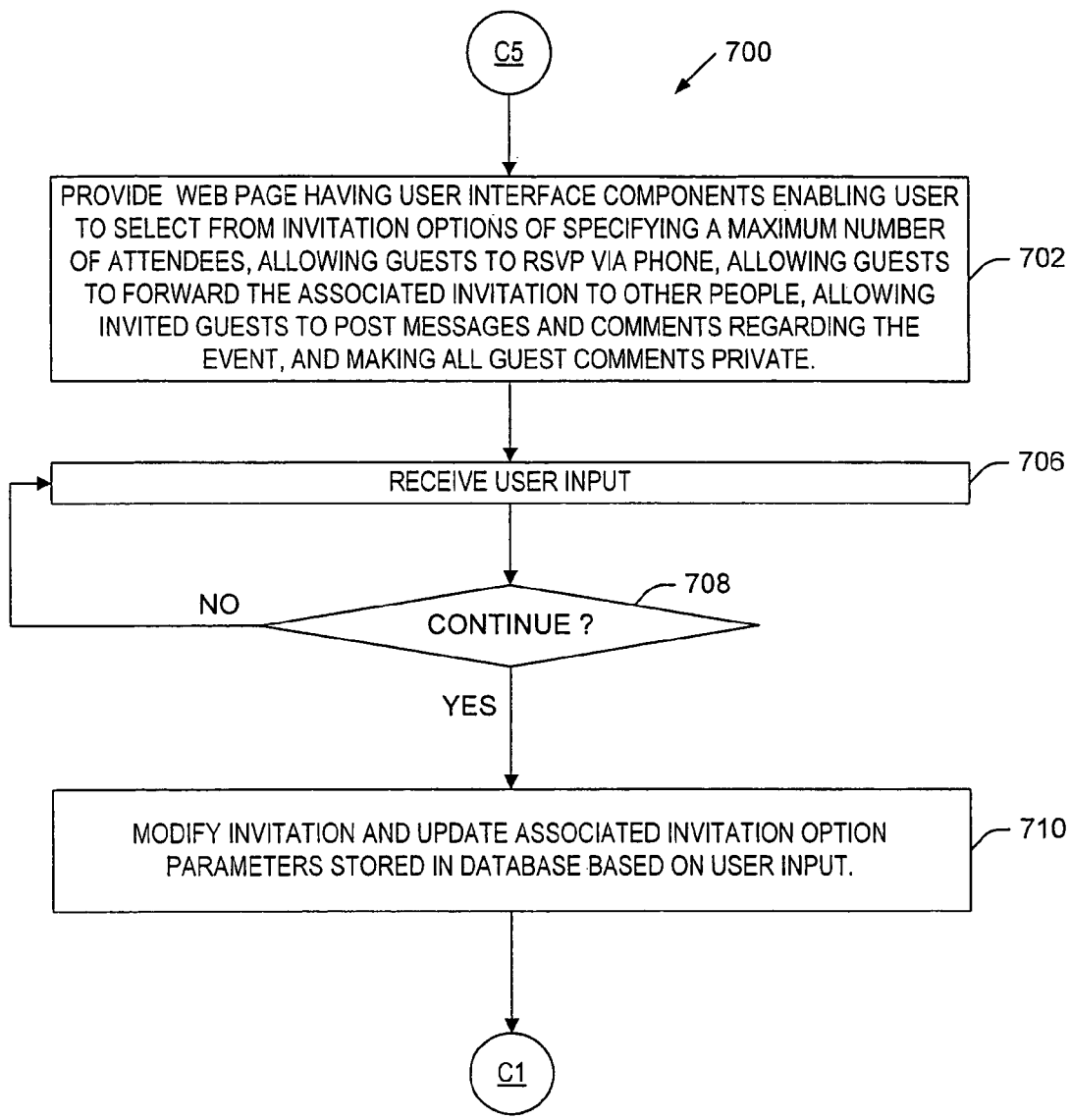
FIG. 16 is a flow diagram generally illustrating a process of providing a user interface via the Web page of FIG. 15.

FIG. 16 shows a flow diagram generally illustrating a process at 700 for providing the Web page 650 (FIG. 15). The process 700 proceeds from "C3" (from FIG. 11). The process 700 begins with the process 702 in which the event planning system provides user interface components enabling the user to select from invitation options of specifying a maximum number of attendees, allowing guests to RSVP via phone, allowing guests to forward the associated invitation to other people, allowing guests to post messages and comments regarding the event, and making all guests comments private as described above with reference to the Web page 650 (FIG. 15). In step 706, the event planning system receives user input, and if it is determined at 708 that the user has activated the continue button 662 (FIG. 15), the event planning system receives the user input and proceeds to execute step 710 in which the system modifies the invitation and updates associated invitation option parameters stored in the database (FIG. 1A) based on the user input. From step 710, the process proceeds back to "C1" (to FIG. 11).

FIG. 17 shows a block diagram generally illustrating a Web page at 720 enabling the user to specify questions to be asked of invited guests via the invitation. The Web page 720 is provided by the event planning system in response to the user activating the guest interaction button for asking questions at 408 (FIG. 9). The Web page 720 includes a plurality of sets of GUI components 722 enabling the planner to create a question to be asked of an invited guest. Each set of question GUI components 722 includes: a question text box 724 enabling the planner to type a question to be asked; an answer type dropdown list 726 enabling the planner to select from a plurality of answer types including (text), (choice), (number), and (yes/no); a text box 728 enabling the planner to enter possible answers for (choice), type questions and answers; and a check box 730 enabling the planner to select the option of letting other invitees see the responses to the associated question. The Web page 720 further includes a button 732 enabling the planner to create more questions and answer choices, a button 736 enabling the planner to continue and enter the information provided via the Web page 720 to the event planning system, and a cancel button 738 enabling the planner to cancel the entry of information provided via the Web page.

Figure 18:
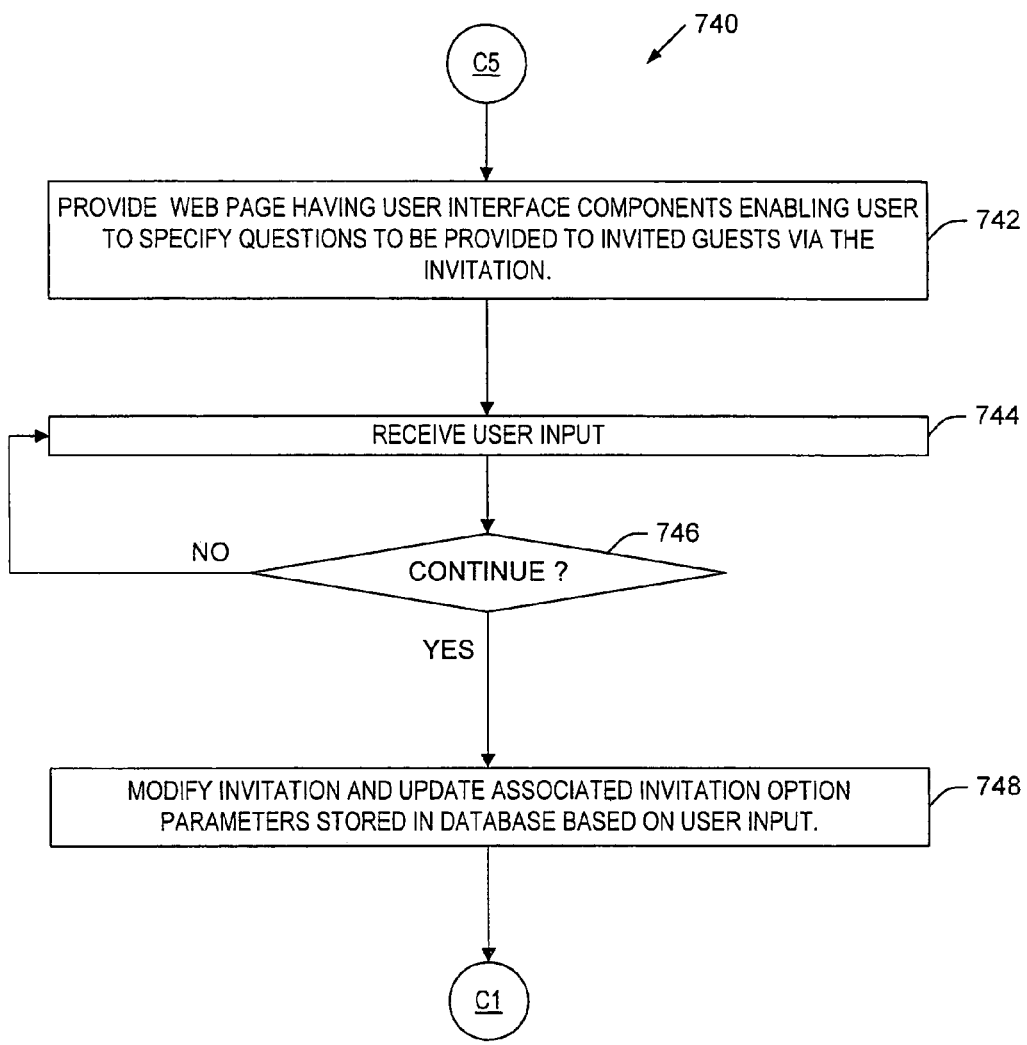
FIG. 18 is a flow diagram generally illustrating a process of providing a user interface via the Web page of FIG. 17.

FIG. 18 shows a flow diagram generally illustrating a process at 740 for providing the Web page 720 (FIG. 17). The process 740 proceeds from "C5" (from FIG. 12) to step 742 in which the event planning system provides the user interface components shown in the Web page 720 (FIG. 17) enabling the user to specify questions to be provided to invited guests via the invitation. In step 744, the event planning system receives user input via the Web page 720 (FIG. 17), and if the continue button 736 (FIG. 17) is activated, the process proceeds to step 748 in which the event planning system modifies the invitation to include the questions provided the Web page, and updates the associated invitation option parameters stored in the database 16 (FIG. 1A). From step 748, the process proceeds back to "C1" (back to FIG. 12).

FIG. 19 shows a block diagram generally illustrating a Web page for inviting more guests at 760. The Web page 760 is generated by the event planning system and provided to the user in response to the user activating the invitation option for inviting more guests at 406 (FIG. 9). The Web page 760 enables the user to invite additional guests to a planned event, and to specify delivery options for delivering the invitation. The Web page 760 includes: a plurality of interface components at 762 enabling the user to uninvite selected guests that have been previously invited; an anchor area 764 enabling the user to invite guests from the planner's address book; a button 768 enabling the planner to invite guests in the selected contact group; a set of interface components at 766 enabling the planner to send invitations to all guests, or to a specified group of recipients such as new guests only or guests who have not yet responded; a scroll down text box 770 enabling the planner to type in guests' E-mail addresses associated with invited guests; a plurality of delivery option check boxes at 772 enabling the planner to specify sending an invitation to the planner, specifying that the event is by invitation only, specifying that the event is to be listed in the public events directory, allowing invitees to see who has been invited and who will attend, offering automated telephone response registration via the IVR system 24 (FIG. 1A), and allowing invited guests to forward invitations to other people; a continue button 774; and a cancel button 776.

Figure 20:
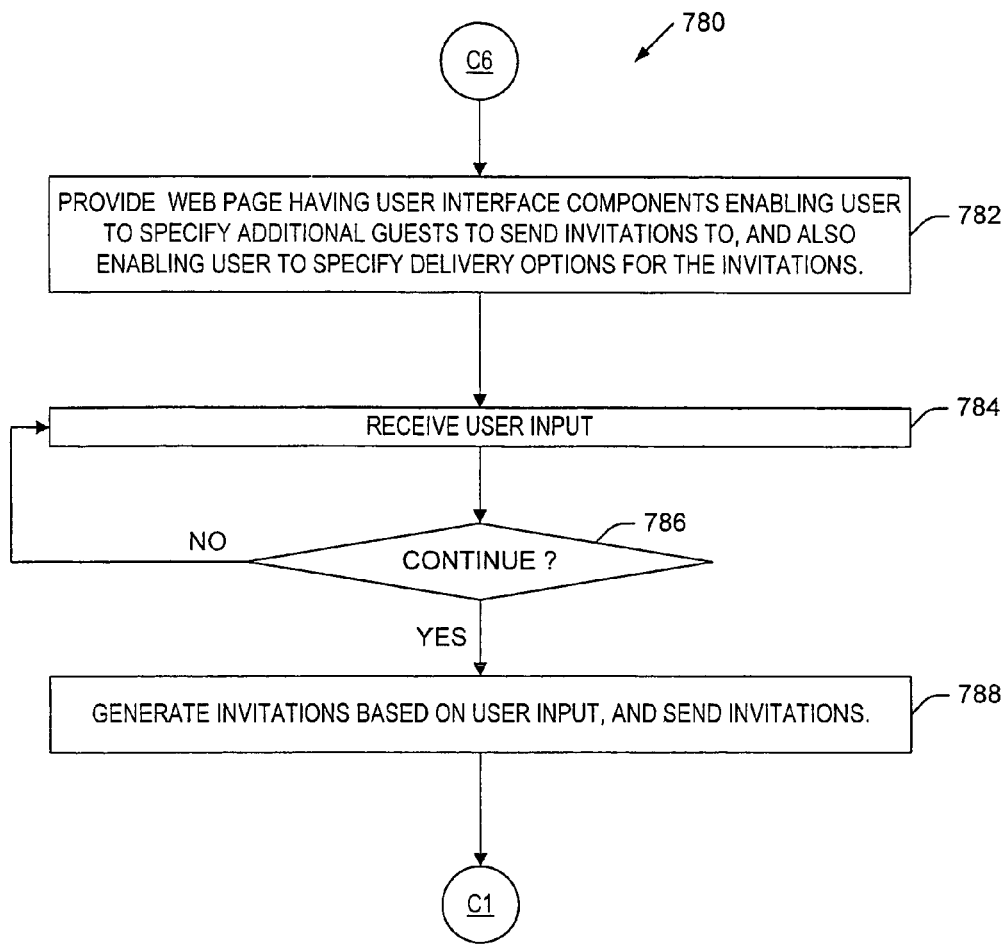
FIG. 20 is a flow diagram illustrating a process of providing a user interface via the Web page of FIG. 19 enabling the user to invite more guests to the planned event.

FIG. 20 shows a flow diagram illustrating a process at 780 executed by the event planning system for providing the Web page 760 (FIG. 19) enabling the user to invite more guests to the planned event. The process 780 proceeds from "C6" (from FIG. 12) to step 782 in which the event planning system provides user interface components enabling the user to specify additional guests to send invitations to, and also enabling the planner to specify delivery options for the invitations as described above with reference to the Web page 760 (FIG. 19) for inviting additional guests. In step 784, the event planning system receives user input provided via the Web page 760 (FIG. 19), and if it is determined that the planner has activated the continue button 774 (FIG. 19), the process proceeds to step 788 in which the event planning system generates the invitations based on the user input received in step 784 above. From step 788, the process proceeds to "C1" (back to FIG. 12).

Figure 21:
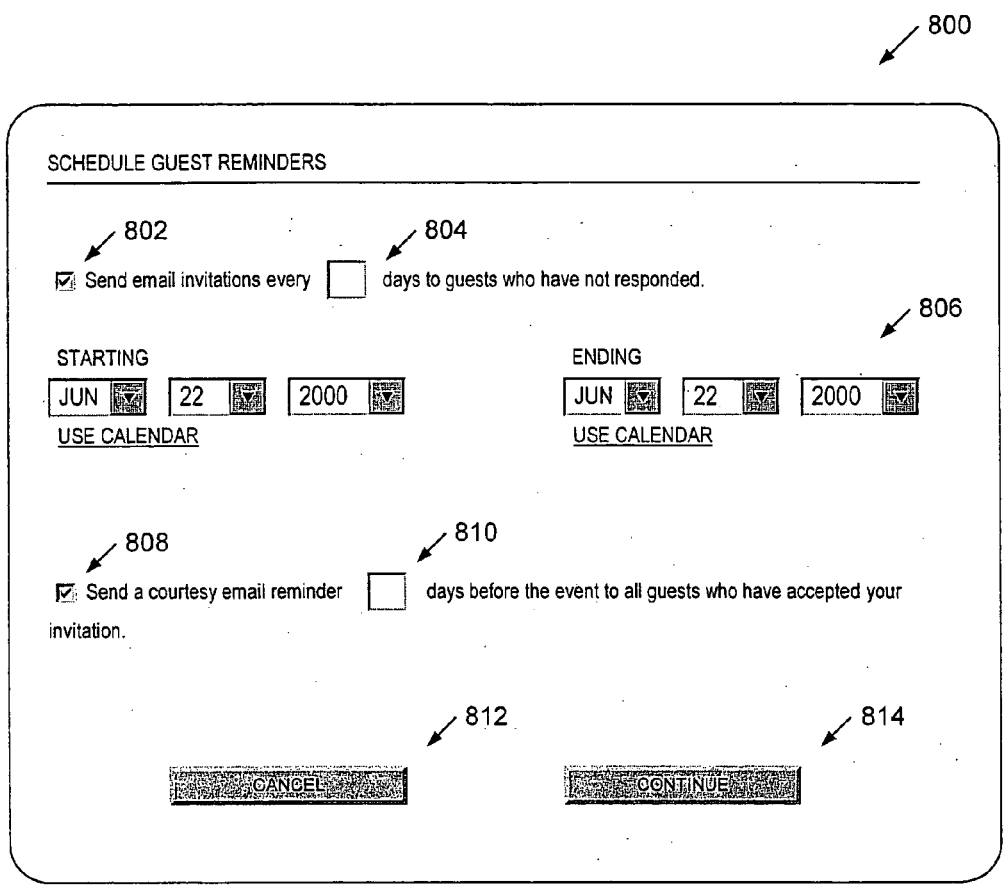
FIG. 21 is a block diagram generally illustrating a Web page enabling the user to schedule the sending of reminders to invited guests.

FIG. 21 shows a block diagram generally illustrating a Web page at 800 enabling a user to specify a schedule for sending reminders to invited guests. The Web page 800 is generated by the event planning system in response to the user activating the invitation option for scheduling guest reminders at 406 (FIG. 9).

FIG. 22 shows a flow diagram generally illustrating a process at 820 for enabling an event planner to schedule guest reminders. The process 820 proceeds from "C7" (from FIG. 12) to step 822 in which the event planning system provides user interface components enabling the user to schedule guest reminders. In the preferred embodiment, the process 820 is executed by generating the Web page 800 (FIG. 21). In step 824, the event planning system receives user input via the Web page 800 (FIG. 21), and if it is determined at 826 that the planner has activated the continue button 814 (FIG. 21), then the process proceeds to step 828 in which the event planning system updates guest reminders schedule parameters stored in the database 16 (FIG. 1A). In step 830, the event planning system sends guest reminders in accordance with the guest reminder schedule as defined via the guest reminder Web page 800 (FIG. 21).

FIG. 23 shows a block diagram generally illustrating a ticket setup Web page at 850 that is provided by the event planning system in response to the event planner activating the event option for setting up ticketing at 410 (FIG. 9). The ticket setup Web page 850 includes: a set of radio buttons at 852 enabling the planner to specify that the event is a free event, or that the event planner wishes to charge for this event; a continue button 854; a check box 856 enabling the event planner to indicate that the ticket is "free" on the invitation; a check box 858 enabling the event planner to specify that a convenience fee will be charged for each ticket processed from proceeds of ticket sales; a radio button 890 enabling the event planner to specify that the convenience fee will be charged for each ticket processed by passing the convenience fee to the customers; a set of GUI components 892 enabling the event planner to specify a purchase deadline for purchasing discounted early tickets at a discounted price; a text box at 894 enabling the event planner to specify a name for the associated ticket; a text box at 896 enabling the event planner to enter a text description of the associated ticket; a set of GUI components 898 enabling the event planner to specify a ticket prices for the associated ticket and displaying the last day to buy, convenience fee, total customer cost, order processing fee, and event planners' revenue, and also including a button 900 enabling the event planner to set early pricing for the associated ticket; a continue button 910; and a cancel button 912.

Figure 24:
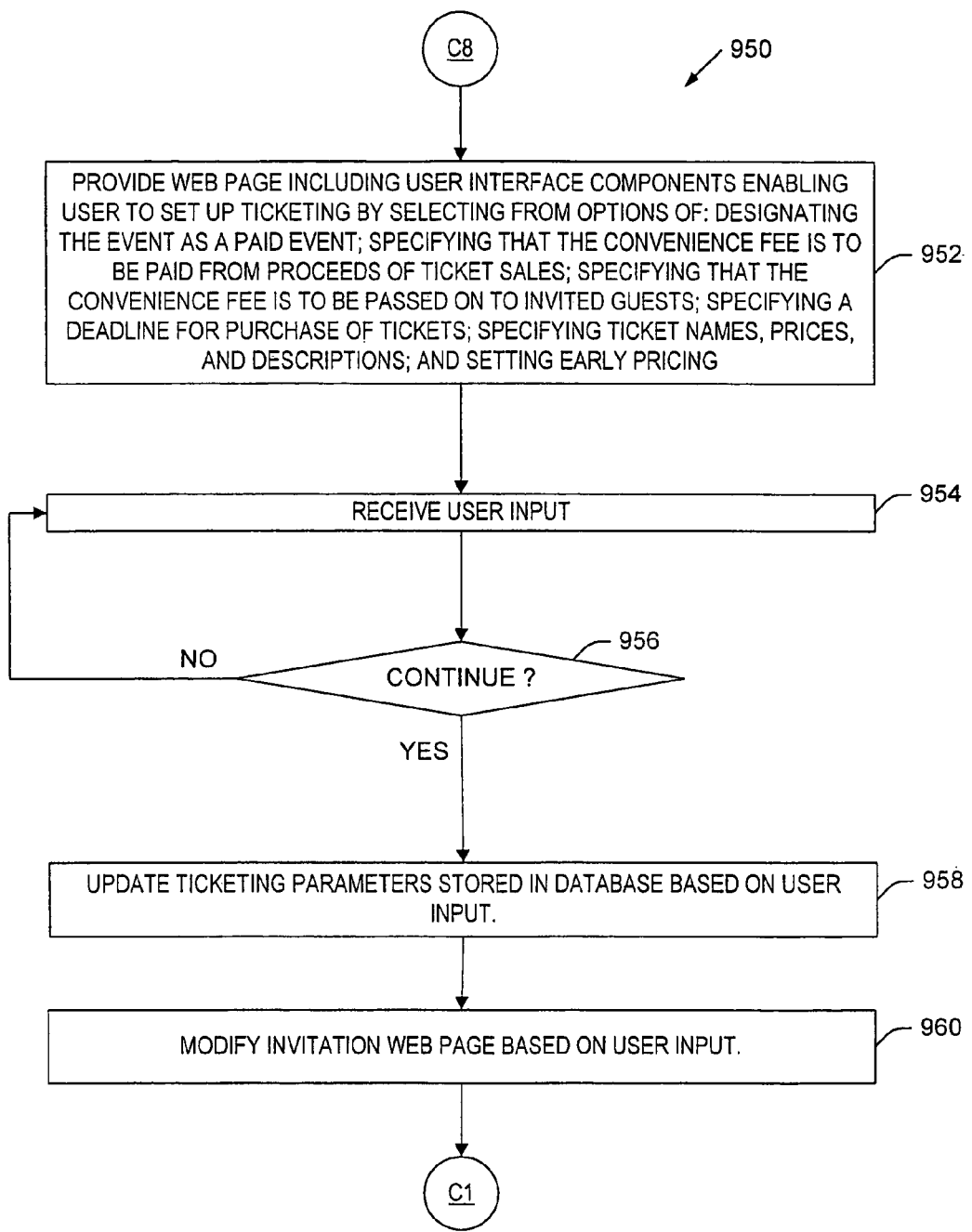
FIG. 24 is a flow diagram illustrating a process of generating the ticket set up Web page.

FIG. 24 shows a flow diagram illustrating a ticket setting process at 950. The process 950 proceeds from "C8" (from FIG. 12) to step 952 in which the event planning system provides user interface components enabling the user to set up a ticket by selecting from options of: designated the event as a paid event; specifying that the convenience fee is to be paid from proceeds of ticket sales; specifying that the convenience fee is to be passed on to invited guests; specifying a deadline for purchase of early discounted tickets; specifying ticket names, prices and descriptions; and setting early pricing parameters. In step 954, the event planning system receives user input via the ticket setup Web page 850 (FIG. 23), and if it is determined at 956 that the event planner has activated the continue button 910 (FIG. 23), then the process proceeds to step 958 in which the event planning system updates ticketing parameters stored in the database 16 (FIG. 1A) based on the user input received in step 954. In step 960, the event planning system modifies the invitation Web page based on the user input to provide information regarding ticketing for invited guests, after which the process proceeds back to "C1" (back to FIG. 11).

Figure 25:
FIG. 25 is a block diagram generally illustrating an event summary Web page provided by the event planning system.

FIG. 25 shows a block diagram generally illustrating an event summary Web page at 1000 that is provided by the event planning system in response to an event planner activating one of the active areas associated with either a current event or a past event previously planned by the user as shown at 252 and 254 (FIG. 4) of the personal account Web page 250 (FIG. 4). The event summary Web page 1000 provides a summary of information associated with a planned event. The event summary Web page 1000 includes information indicative of a URL for linking to the associated invitation Web page, information indicative of the time and place of the event, what is happening at the event, and the event status which indicates whether the event is complete, incomplete, cancelled, or deleted.

The event summary Web page 1000 further includes: an anchor area at 1002 enabling the planner to modify the invitation event page; an anchor area 1004 enabling the planner to send invitations to guests; an RSVP status information display area 1008 for displaying a maximum number of attendees specified for the event, and the total number of persons invited to the event; a total registrant information display area 1010 for displaying the total number of invited guests who have thus far registered, the total number of invited guests who have indicated that they will "maybe" attend the planned event, the total number of invited guests who have declined to attend the planned event, and the total number of invited guests who have thus far not responded to the associated invitation. The event summary Web page 1000 further includes a plurality of interface components enabling the user to initiate functions including modifying the invitation page by activating text displayed at 1002, sending invitations to guests by activating the text at 1004, inviting more guests by activating the text at 1006, sending reminders to all invited guests who have not yet responded by activating text at 1012, and indicating that the user is done with the event summary Web page by activating a done button 1014.

Figure 26:
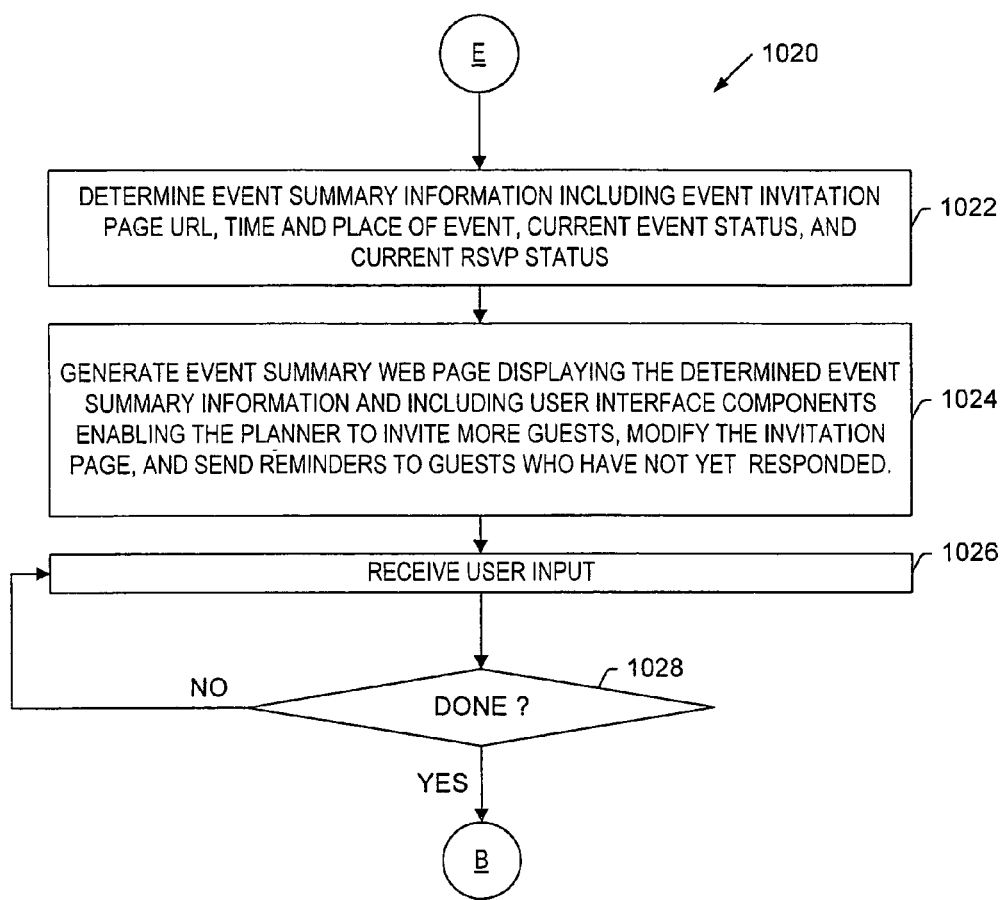
FIG. 26 is a flow diagram generally illustrating an event summary generating process.

FIG. 26 shows a flow diagram generally illustrating an event summary generating process at 1020. The depicted process proceeds from "E" (from FIG. 6) to step 1022 in which the event planning system determines event summary information for a selected event, the event summary information including an invitation page uniform resource locator (URL), a time and place for the selected event, the current event status, and the current RSVP status of guests invited to the selected event. In step 1024, the event planning process generates the event summary Web page 1000 (FIG. 25) displaying the determined event summary information and including user interface components enabling the planner to invite more guests, modify the invitation page, and send reminders to guests who have not yet responded. In step 1026, the event planning system receives user input via the Web page 1000 (FIG. 25) and if it is determined at 1028 that the user has activated the done button 1014, the process proceeds back to "B" (back to FIG. 6).

Figure 27:
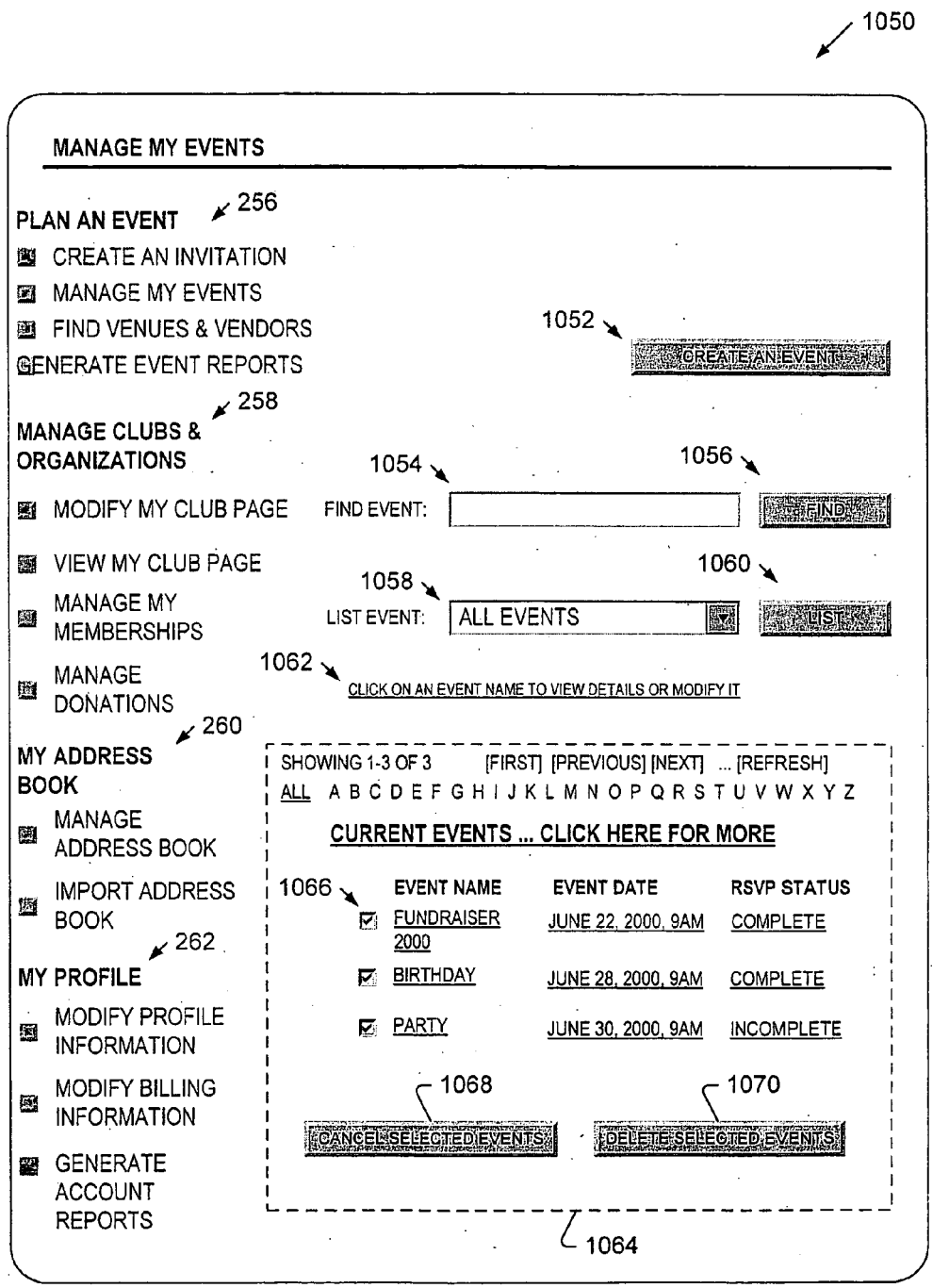
FIG. 27 is a block diagram generally illustrating an event management Web page for displaying a list of events previously planned by the user and enabling the user to manage information associated with selected events.

FIG. 27 shows a block diagram generally illustrating an event management Web page 1050 for displaying a list of events previously planned by the user and enabling the user to manage information associated with particular events. The event management Web page 1050 is generated by the event planning system in response to the user activating the event management anchor at 256 (FIG. 4) of the personal event planning account Web page 250 (FIG. 4). The event management Web page 1050 includes: a button at 1052 enabling the user to initiate a process for creating a new event; a text box at 1054 enabling the user to enter text indicative of a previously planned event; a find button 1056 which when activated causes the event planning system to search for an event as specified by text entered in the box 1054; an event drop down list 1058 enabling the user to select from a plurality of events previously planned by the user; and a list button at 1060 which when activated causes the event planning system to provide a list of additional events previously planned by the user. The event management Web page further includes a event display area 1064 including: a plurality of check boxes at 1066 each being associated with a previously planned event wherein each of the displayed events has an event name, and event date, and an RSVP status information displayed therewith. The display area 1064 further includes a button 1068 enabling the user to cancel events selected using the check boxes 1066, and a button 1070 enabling the user to delete events selected using the check boxes 1066.

Figure 28:
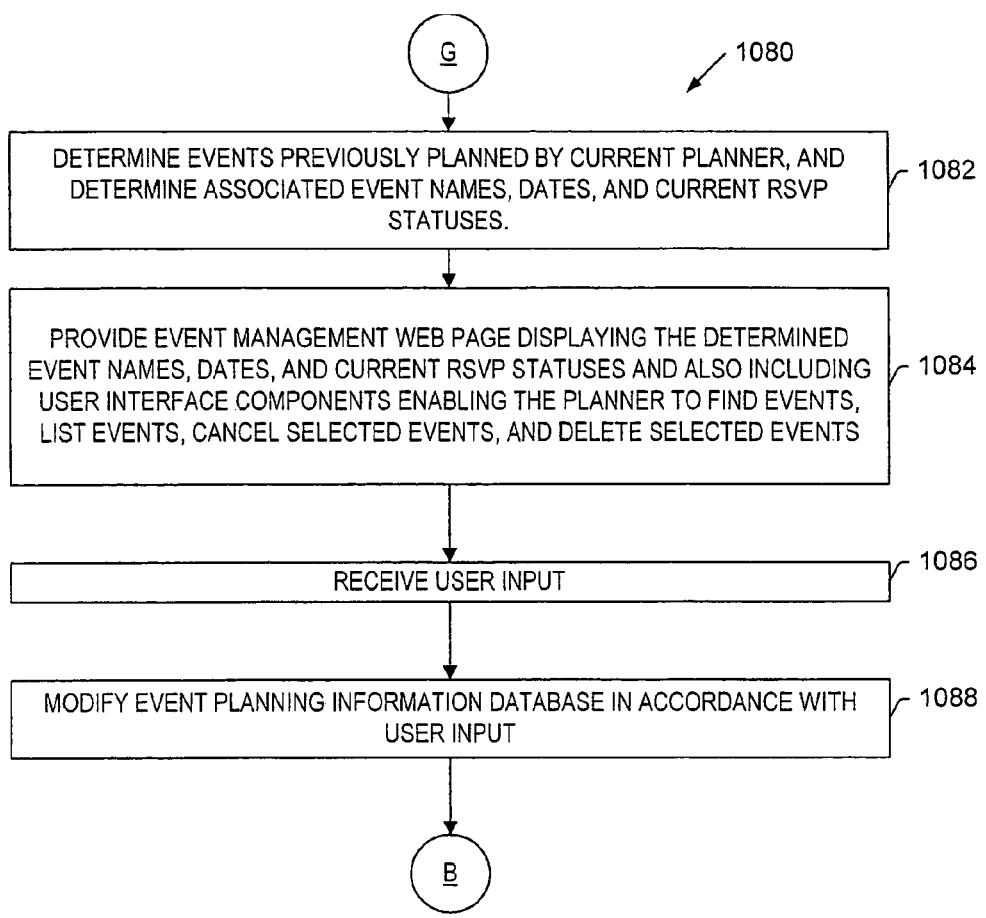
FIG. 28 is a flow diagram illustrating an event management process in accordance with the present invention.

FIG. 28 shows an event management process at 1080 in accordance with the present invention. The process 1080 proceeds form "G" (from FIG. 7) to step 1082 in which the event planning system determines all events previously planned by the current user, and determines associated event names, dates, and current RSVP statuses for each of the listed events. In step 1084, the event planning system generates the event management Web page 1050 (FIG. 27) for displaying the determined event names, dates and current RSVP status of each of the listed events, and also including user interface components enabling the planner to find events, list events, cancel selected events, and delete selected events. In step 1086, the event planning system receives user input. In step 1088, the event planning system modifies information in the database 16 (FIG. 1A) in accordance with the input received in step 1086. From 1088, the process proceeds to "B" (back to FIG. 5).

Figure 29:
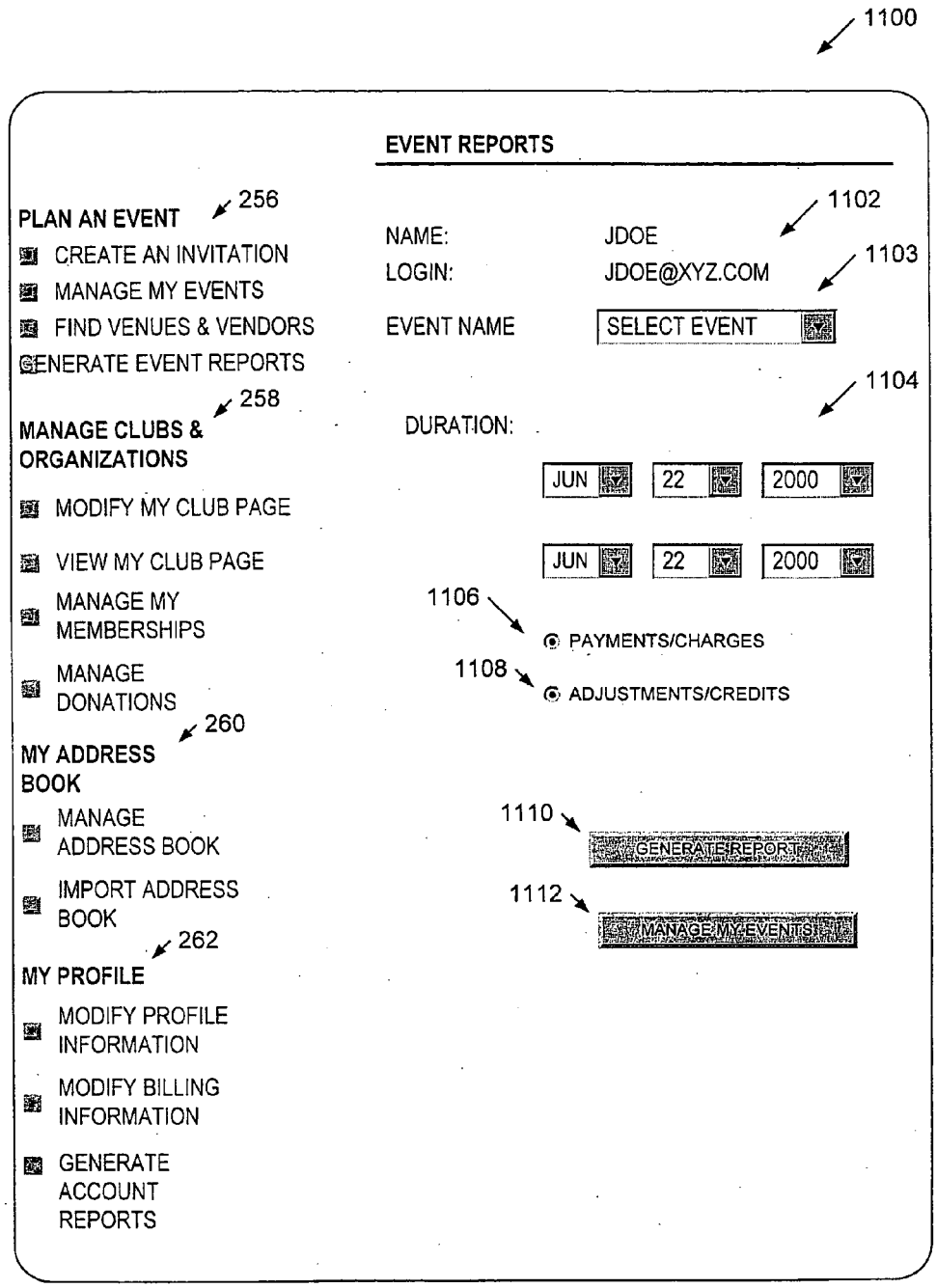
FIG. 29 is a block diagram generally illustrating an event reporting Web page enabling the user to select from a list of events previously planned by the user, and to generate an event report associated with a selected event.

FIG. 29 shows a block diagram generally illustrating an event reporting Web page 1100 for displaying a list of events previously planned by the user, and enabling the user to generate event reports associated with a selected event. The event management Web page 1100 is generated by the event planning system in response to the user activating the event report anchor at 256 (FIG. 4) of the personal event planning account Web page 250 (FIG. 4). The event report Web page 100 includes: name and login information displayed at 1102; an event name drop down list 1103 enabling the user to select from a plurality of events previously planned by the user; a set of duration interface components 1104 enabling the user to specify a period for which event information is to be generated in the event report; a first radio button 1106 enabling the user to specify that the event report is to include information indicative of payments and charges for the selected event during the specified period; and a second radio button 1108 enabling the user to specify that the event report is to include information indicative of adjustments and credits for the selected event during the specified period. The event report Web page 100 also includes a button 1110 for generating the specified report, and a button 1112 for linking to the event management Web page 1050 (FIG. 27).

Figure 30:
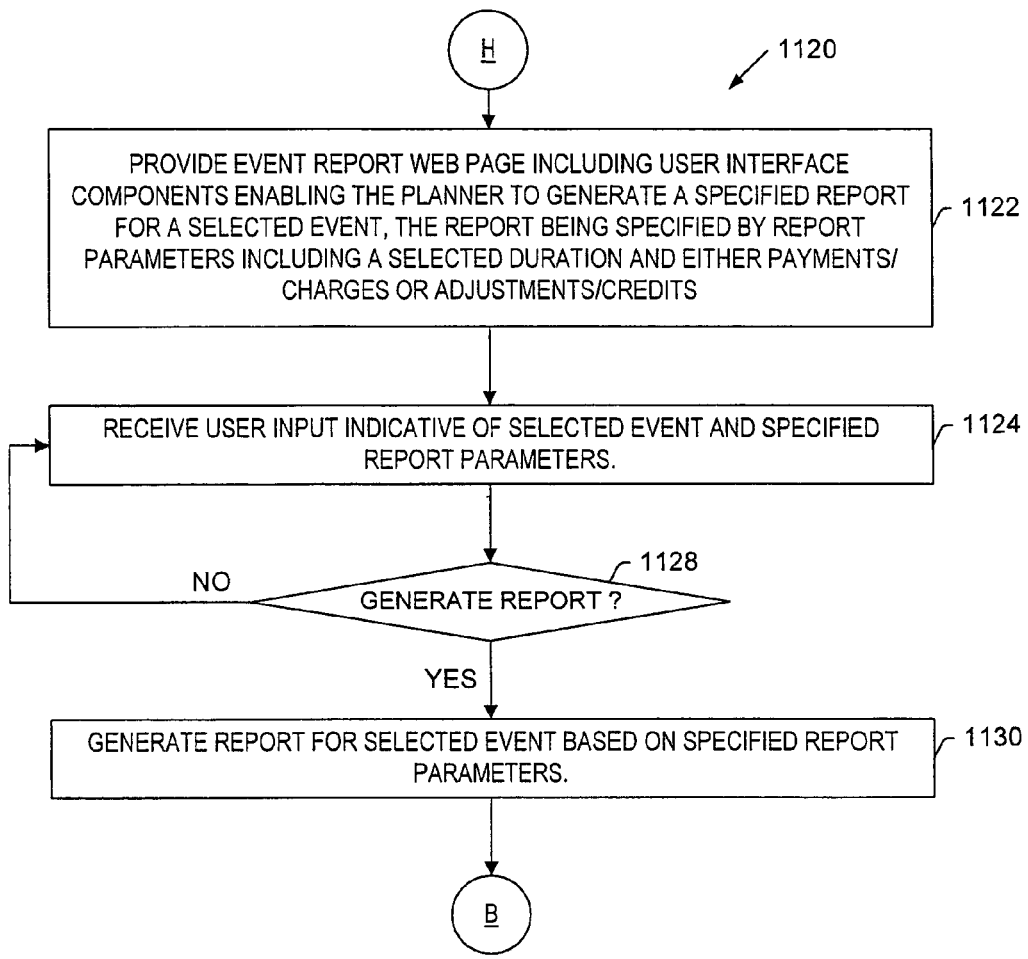
FIG. 30 is a flow diagram generally illustrating an event management process in accordance with the present invention.

FIG. 30 shows an event report generating process at 1120 in accordance with the present invention. The process 1120 proceeds form "H" (from FIG. 7) to step 1122 in which the event planning system generates the event reporting Web page 1100 (FIG. 29) as described above. In step 1124, the event planning system receives user input. In step 1130, the event planning system generates an event report for the selected event, the report including either payment/charge information of adjustment/credit information associated with the specified period. From step 1130, the process proceeds to "B" (back to FIG. 5).

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. An event planning process executed by a server system in a computer network including a plurality of user terminals communicatively coupled with the server system via the network, the process comprising the steps of:

providing an event planning graphical user interface at a user terminal, the interface enabling a user to plan an event;

receiving event information input by the user, said event information indicating a scheduled event, at least one invitee to be invited to said scheduled event and information indicative of RSVP fees required to attend said scheduled event;

providing an invitation to said invitee, said invitation indicating said scheduled event and said RSVP fees, and soliciting a response to said invitation, wherein an affirmative response to said invitation requires a payment as defined by said RSVP fees;

receiving RSVP status information including payment information from said invitee; and verifying said payment information.

2. An event planning process as recited in claim 1 wherein said step of providing an event planning graphical user interface at the user terminal includes generating at least one event planning Web page that is accessible at the user terminal via the network, said event planning Web page including embedded code for providing said event planning graphical user interface.

3. An event planning process as recited in claim 2 further comprising the steps, of:
providing an event summary Web page to the user terminal, the event summary Web page enabling the user to select from at least one previously planned event;
receiving user input from said user via said event summary Web page, said user input indicating a selected one of the previously planned events;
generating event summary information associated with the selected event, said event summary information comprising RSVP status information associated with each of the invitees for selected event; and
transmitting said event summary information to said user terminal.

4. An event planning process as recited in claim 2 further comprising the steps of:
providing an event report Web page to the user terminal, the event report Web page enabling the user to select from at least one previously planned event;
receiving user input from said user via said event report Web page, said user input indicating a selected one of the previously planned events;
generating event report information associated with the selected event, said event report information comprising RSVP fee status information associated with each of the invitees for said selected event; and
transmitting said event report information to said user terminal.

5. An event planning process as recited in claim 1 wherein said steps of providing an invitation to said invitee and receiving RSVP status information further comprise:
generating an invitation Web page based on said event information, said invitation Web page being accessible via the network and being operative to provide an invitation response graphical user interface for enabling said invitee to respond to said invitation;
sending an invitation message to said invitee, said invitation message prompting said invitee to view said invitation Web page; and
receiving input provided by said invitee via said invitation Web page, said input provided by said invitee indicating said RSVP status information.

6. An event planning process as recited in claim 5 wherein said step of sending an invitation message to said invitee comprises sending an Email message via the network to said invitee at a second user terminal, said Email invitation including a link to said invitation Web page.

7. An event planning process as recited in claim 5 wherein the server system is communicatively coupled with a telephone system, and wherein said step of sending an invitation message to said invitee comprises sending a fax invitation message to said invitee via said telephone system, said fax invitation including a universal resource locator for accessing said invitation Web page via the network.

8. An event planning process as recited in claim 5 wherein said step of sending an invitation message to said invitee comprises sending a post card to said invitee, said post card providing a universal resource locator for accessing said invitation Web page via the network.

9. An event planning process as recited in claim 5 wherein:
said step of providing an event planning graphical user interface at the user terminal comprises a step of providing a plurality of invitation templates each being associated with a different type of event and having at least one associated graphical image;
said step of receiving event information includes receiving information indicative of a selected one of said templates; and
said step of generating an invitation Web page includes generating an invitation Web page based on said selected template, said invitation Web page displaying said associated graphical image.

10. An event planning process as recited in claim 5 wherein said step of providing an event planning graphical user interface comprises prompting the user to indicate whether said scheduled event is to be listed in a public events directory, and wherein said event information indicates whether said scheduled event is to be listed in the public events directory, and further comprising the step of:
if said event information indicates that said scheduled event is to be listed in the public events directory, providing a link to said invitation Web page from a Web page that is accessible via the network, said invitation Web page allowing anyone who accesses said invitation Web page to RSVP for said scheduled event.

11. An event planning process as recited in claim 5 wherein:
said step of providing an event planning graphical user interface comprises prompting the user to specify a question for said invitee;
said event information specifies said question;
said invitation Web page is further operative to provide invitation response graphical user interface components enabling said invitee to provide a response to said question; and
said step of receiving input comprises receiving information indicative of said response.

12. An event planning process as recited in claim 11 wherein said invitation Web page is further operative to enable other invitees to view said response if the user has selected an option of enabling said other invitees to view said response.

13. An event planning process as recited in claim 5 wherein said invitation Web page is further operative to enable said invitee to view RSVP status information associated with each of said other invitees.

14. An event planning process as recited in claim 5 wherein invitees may post messages and comments regarding the event on said invitation Web page.

15. An event planning process as recited in claim 14 wherein said user may specify that all of said posted messages and comments may be viewed only by said user.

16. An event planning process as recited in claim 5 wherein said step of providing an event planning graphical user interface comprises prompting the user to indicate whether said invitee may forward said invitation to other people.

17. An event planning process as recited in claim 5 wherein said invitation Web page provides an invitation response graphical user interface enabling said invitee to select "maybe" as an said RSVP status response.

18. An event planning process as recited in claim 1 wherein the server system is communicatively coupled with an interactive voice response system that is connected to a telephone system, said interactive voice response system being configured to enable said invitee to provide said RSVP status information in response to said invitation, and wherein said RSVP status information is received at the server system via said interactive voice response system.

19. An event planning process as recited in claim 1 wherein:
   said step of providing an event planning graphical user interface at the user terminal comprises providing access to an address book associated with the user, said address book comprising a list of contacts and associated contract addresses;
   said step of receiving event information comprises receiving information indicative of selected ones of said contacts; and
   said step of providing an invitation comprises providing invitations to said selected contacts.

20. An event planning process as recited in claim 1 wherein said step of providing an event planning graphical user interface comprises prompting the user to indicate a schedule for sending reminders to invited guests, and further comprising the step of sending reminder messages to said invitees in accordance with said schedule.

21. An event planning process as recited in claim 1 wherein said step of providing an event planning graphical user interface comprises prompting the user to indicate ticket pricing information indicating a price of at least one type of ticket being offered for admission to said scheduled event, and further comprising a step of determining convenience fees to be paid to administrators of the server system based on sales of said tickets to said invitees.

22. An event planning process as recited in claim 21 wherein said event information provided by said user indicates whether said convenience fees are to be paid from proceeds of ticket sales, or whether said convenience fees are to be passed on to said invitees.

23. An event planning process as recited in claim 21 further comprising the steps of:
   providing an event report Web page to the user terminal, the event report Web page enabling the user to select from at least one previously planned event;
   receiving user input from said user via said event report Web page, said user input indicating a selected one of the previously planned events;
   generating event report information associated with the selected event, said event report information comprising RSVP fee status information and convenience fee information associated with said selected event; and
   transmitting said event report information to said user terminal.

24. An event planning process as recited in claim 1 wherein said step of providing an event planning graphical user interface comprises prompting the user to specify a maximum number of invitees.

25. An event planning process as recited in claim 1 wherein each of said invitees is a member of an organization.

26. The event planning process of claim 1, wherein the step of verifying said payment information comprises linking to a payment processor system to verify the payment information.

27. The event planning process of claim 26, wherein said payment information comprises credit card information and the step of linking to a payment processor system comprises providing the payment information to the payment processor in order to initiate a credit card transaction.

28. The event planning process of claim 1, further comprising storing RSVP status information for said invitee in a database.

29. The event planning process of claim 28, wherein the database is configured to store information about a plurality of scheduled events and RSVP fee status information about each of the plurality of scheduled events.

30. The event planning process of claim 28, wherein the database is configured to store information about a plurality of options associated with a scheduled event and RSVP status information associated with each of the plurality of options.

31. The event planning process of claim 30, wherein the plurality of options comprises one of: payment options, ticket category options, and options for receiving an invitee response.

32. The event planning process of claim 1, wherein each of the plurality of RSVP fees associated with one of: an invitee status and a selection by the invitee of an option associated with the scheduled event.

33. The event planning process of claim 32, wherein the invitee status comprises a membership status.

34. An event planning process as recited in claim 1 wherein the steps of providing an invitation to the invitee and receiving RSVP status information further comprise:
   generating an invitation Web page based on the event information, the invitation Web page being publicly-accessible via the network to a plurality of viewers comprising the invitee and being operative to provide an invitation response graphical user interface for enabling the invitee to respond to the invitation;
   receiving input provided by the invitee via the invitation Web page, the input provided by the invitee indicating the RSVP status information.

35. A computer program product, the computer program product comprising a computer readable medium having stored therein computer-executable instructions for performing the steps of:
   providing an event planning graphical user interface, the interface configured to receive information associated with an event;
   receiving event information specifying an event, at least one invitee to be invited to the event, and RSVP fee information specifying a fee required to attend the event;
   electronically storing the event information in a database;
   electronically providing an invitation to the invitee that comprises the event information and RSVP fee information and solicits a response to the invitation, an affirmative response to the invitation requiring a payment responsive to the RSVP fee information;
   electronically receiving a response to the invitation from the invitee comprising payment information; and
   electronically providing the payment information to a payment processing server for verification.

36. The computer program product of claim 35, wherein the event planning graphical user interface comprises a portion for receiving the RSVP fee information.

37. The computer program product of claim 35, wherein the portion comprises one of: a button, a check box, a text box, and a menu.

38. The computer program product of claim 35, wherein the event planning graphical user interface comprises at least one graphical component for specifying ticketing information, the ticketing information comprising one of: ticket category information, ticket price information, and ticket discount information.

39. The computer program product of claim 38, wherein the ticket discount information is associated with one of: a membership discount and an early response discount.

40. The computer program product of claim 35, further comprising instructions encoded on the media for linking to a payment processor system to verify the payment information.

41. The computer program product of claim 35, wherein said payment information comprises credit card information and the step of linking to a payment processor system comprises providing the payment information to the payment processor in order to initiate a credit card transaction.

42. An event planning process executed by a server system in a computer network including a plurality of user terminals communicatively coupled with the server system via the network, the process comprising the steps of:

providing an event planning graphical user interface at a user terminal, the interface enabling a user to plan an event;

receiving event information input by the user, the event information indicating a scheduled event and information indicative of RSVP fees required to attend the scheduled event;

generating an invitation Web page based on the event information, the invitation Web page being publicly-accessible via the network to a plurality of viewers including a first viewer and being operative to provide an invitation response graphical user interface for enabling the first viewer to respond to the invitation, wherein an affirmative response to the invitation requires a payment of one of the plurality of RSVP fees;

receiving input provided by the first viewer via the invitation Web page, the input provided by the first viewer indicating the RSVP status information comprising payment information; and verifying the payment information.

\* \* \* \* \*

UNITED STATES PATENT AND TRADEMARK OFFICE
CERTIFICATE OF CORRECTION

| | | |
|---|---|---|
| PATENT NO. | : 8,065,171 B2 | Page 1 of 1 |
| APPLICATION NO. | : 10/785382 | |
| DATED | : November 22, 2011 | |
| INVENTOR(S) | : Justin T. Nguyen et al. | |

It is certified that error appears in the above-identified patent and that said Letters Patent is hereby corrected as shown below:

Column 26, claim 29, line 1, delete "fee".

Signed and Sealed this
Fourteenth Day of February, 2012

David J. Kappos
*Director of the United States Patent and Trademark Office*